(12) United States Patent
Morita

(10) Patent No.: US 6,526,182 B2
(45) Date of Patent: *Feb. 25, 2003

(54) IMAGE MERGING AND DISPLAYING APPARATUS AND METHOD

(75) Inventor: Toshihiro Morita, Yokohama (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/186,278

(22) Filed: Nov. 5, 1998

(65) Prior Publication Data

US 2001/0043756 A1 Nov. 22, 2001

(30) Foreign Application Priority Data

Nov. 13, 1997 (JP) .............................. 9-311843

(51) Int. Cl.[7] .......................... G06K 9/36; G09G 5/00; H04N 9/74; H04N 1/40; H04N 1/387
(52) U.S. Cl. ..................... 382/284; 345/629; 345/640; 348/586; 382/294; 358/449; 358/450
(58) Field of Search ................................. 382/284, 245, 382/248, 290, 293, 298, 299, 289, 294; 345/629, 634; 348/586; 358/449, 450; 707/508, 530

(56) References Cited

U.S. PATENT DOCUMENTS

| 4,338,673 | A | * | 7/1982 | Brown ........................ 364/523 |
| 5,025,396 | A | * | 6/1991 | Parks et al. .................. 364/518 |
| 5,134,669 | A | * | 7/1992 | Keogh et al. .................. 382/61 |
| 5,631,983 | A | * | 5/1997 | Ohnishi et al. ............. 382/284 |
| 5,825,944 | A | * | 10/1998 | Wang ......................... 382/309 |
| 5,845,304 | A | * | 12/1998 | Iijima ......................... 707/530 |

* cited by examiner

Primary Examiner—Bhavesh Mehta
Assistant Examiner—Yosef Kassa
(74) Attorney, Agent, or Firm—Oblon, Spivak, McClelland, Maier & Neustadt, P.C.

(57) ABSTRACT

An image merging and displaying apparatus for forming an image to be displayed on a display. A document editing device edits document image by generating document image data. A document data obtaining device obtains the document image data from the document editing device. A sheet image data generating device generates sheet image data that constitutes a sheet image having a size in accordance with the document image. An image data merging/reducing device first merges the document image data with the sheet image data, and second reduces an image constituted by the thus merged image data to form an image to be displayed on the display.

23 Claims, 17 Drawing Sheets

IMAGE MERGING AND DISPLAYING APPARATUS AND METHOD

BACKGROUND OF THE INVENTION

1. Field of the Invention

This invention relates to an image merging and displaying apparatus such as a personal computer, and a method capable of generating an image to be displayed on a display, and in particular, relates to an image generating and displaying apparatus that generates an easily confirmable image by merging a document image edited by a document editing device with another image in a unique manner and that displays the image on the display.

2. Discussion of the Background Art

In a background personal computer, a plurality of kinds of document images are edited by a plurality of kinds of document editing functions, such as a word processing function, a document making function using a spread sheet program such as LOTUS 1-2-3, and so on. Each of the document images is then displayed on a display of the personal computer so that a content thereof is confirmed before printing out the document images. It is generally preferable to a user that a content of such a reduced document image, rather than a layout thereof, can be easily confirmed when displayed on the display.

However, document images are edited by different kinds of editing functions, each of which tends to have a different size or a different ratio between a length and width, thereby resulting in non-unity of a size of the document image. For example, an area occupied by sentences, a heading of a first page, each generally edited by the word processing function, a document made by a spread sheet program, for example, and a substantial area of a photographic image edited by an image editor, for example, each vary depending upon such a kind of editing function.

As background arts, there exists numerous proposals that teach both an image data coding system that converts image data into code data and a reduction system that reduces an image constituted by image data. (1) For example, as described in Japanese Patent Application Laid Open No. 09-204158/1997, an algorithm that avoids disappearance of a thin line when a document image is reduced is well known to the public.

Further, as described in Japanese Patent Application laid Open No. 09-18701/1997, there exists numerous devices that teach a data thinning out technology. (2) Further, a data merging system that merges document image data with other data is also well known to the public. For example, as shown in Japanese Patent Application laid Open No. 06-4641/1994, document image data and additional drawing data each having a different data resolution level are separately stored in a memory. The document image data is then merged with the additional drawing data, and the thus merged data are thinned out to obtain an image to be displayed on a display or a printing image having a high quality of a hard copy.

However, when using the above-described background technology (1), a content of a document image edited by the word processing device, the document making device using a spread sheet program such LOTUS 1-2-3, for example, can not be clearly confirmed on a display by a user. Whereas, when using the above-described background technology (2), since a plurality of different document-editing devices are used at a same place, each of document images edited by the same may have a different size from each other.

Further, in the background arts a distinction-ability required to an image to be displayed on a display is insufficient. Further, it is completely different from a system that deals with document image data separately from sheet image data with which the document image is merged. In other words, the user generally feels difficulty in confirming each of contents of the images through the display when each of the images is different in size.

SUMMARY OF THE PRESENT INVENTION

In consideration of the above problems, it is an object of the present invention to provide a novel image merging and displaying apparatus that forms an image to be displayed on a display.

The novel image merging and displaying apparatus includes a document image editing device that edits a document image by generating document image data. A document image data obtaining device obtains the document image data from the document editing device. A sheet image data generating device generates sheet image data that constitutes a sheet image having a prescribed size. An image data merging and reducing device first merges the document image data with the sheet image data, and second reduces an image constituted by the thus merged image data at a prescribed reduction rate by thinning out the image data to form an image to be displayed.

The novel image merging and displaying apparatus can as a further feature include a size data obtaining device that obtains size data indicating a size of the document image, a sheet image size selecting device that selects a sheet image size slightly larger than the document image, and a sheet image data generating device that generates sheet image data constituting a sheet image having a size in accordance with the sheet image size.

The novel image merging and displaying apparatus can as a further feature also include a data kind determining device that determines if the document image data includes image data such as photographic data or the like, and a document image data expanding device that expands a document image constituted by such photographic data or the like to the extent of a sheet image having a prescribed size at a prescribed enlargement rate when the document image data includes the photographic data or the like.

The novel image merging and displaying apparatus can as a further feature also include an image data form information obtaining device that obtains image data form information of a document image, a character data determining device that determines if the document image data generated by the document editing device includes text character data having non-layout information, a text character data obtaining device that obtains text character data from the document editing device, and a sheet image data generating device that generates sheet image data having layout information.

The novel image merging and displaying apparatus can as a further feature also include a blank-character-omitting device that closes up character data by omitting blanked character data and line data existing among the text character data.

The novel image merging and displaying apparatus can as a further feature also include a reduction/enlargement rate data storing device that stores a plurality of reduction/enlargement rate data therein each corresponding to a kind of the document editing device, an editor kind detecting device that detects a kind of the document editor, a reduction/enlargement rate data selecting device that selects a prescribed reduction rate data corresponding to the kind of document editing device detected by the editor kind detecting device, and a document image reducing device that reduces the document image at the thus determined reduction rate.

The novel image merging and displaying apparatus can as a further feature also include a data determining device that determines if document image data is obtained from the document editing device, a mark image data obtaining device that obtains mark image data from the document editing device when the data determining device does not determine the document image data, and an image data merging/reducing device that first merges the mark image data with the sheet image data, and second reduces an image constituted by the thus merged data to form an image to be displayed on the display.

The novel image merging and displaying apparatus can as a further feature also include a mark image data storing device that stores a plurality of mark image data each corresponding to a kind of the document editing device. The mark image data is read therefrom to be merged with the sheet image data when none of mark image data is obtained from the document-editing device.

The novel image merging and displaying apparatus can as a further feature also include an image size-determining device that determines if the document image reduced at the prescribed reduction rate is supposed to be less than a prescribed minimum size and an image data merging/reducing device that reduces the document image at another reduction rate so that an image to be obtained by reducing the document image accords with the minimum size, when the document image reduced at the prescribed reduction rate is supposed to be less than the prescribed minimum size.

The novel image merging and displaying apparatus can as a further feature also include a document image size determining device that determines if a document image reduced at a prescribed reduction rate is larger than a sheet image having a prescribed size that is maximum in use and an image data merging/reducing device that first merges the document image data with the sheet image data, and second reduces an image constituted by the thus merged image data to accord with the sheet image at another reduction rate when the document image size determining device determines that the document image reduced is supposed to be larger than the image sheet having the prescribed size.

The image merging and displaying apparatus can as a further feature also include additional image data generating device that generates additional image data that constitutes additional information, such as a document name and a number of pages, each to be put on corresponding kinds of the document images, and an image data merging/reducing device that merges the additional image data with the document image data.

The novel image merging and displaying apparatus can as a further feature include a pattern-data-storing device that stores pattern data therein that constitutes a pattern, such as a mono color pattern or the like used as a background of a sheet image, and a sheet image data generating device that generates sheet image data merged with some pattern data.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
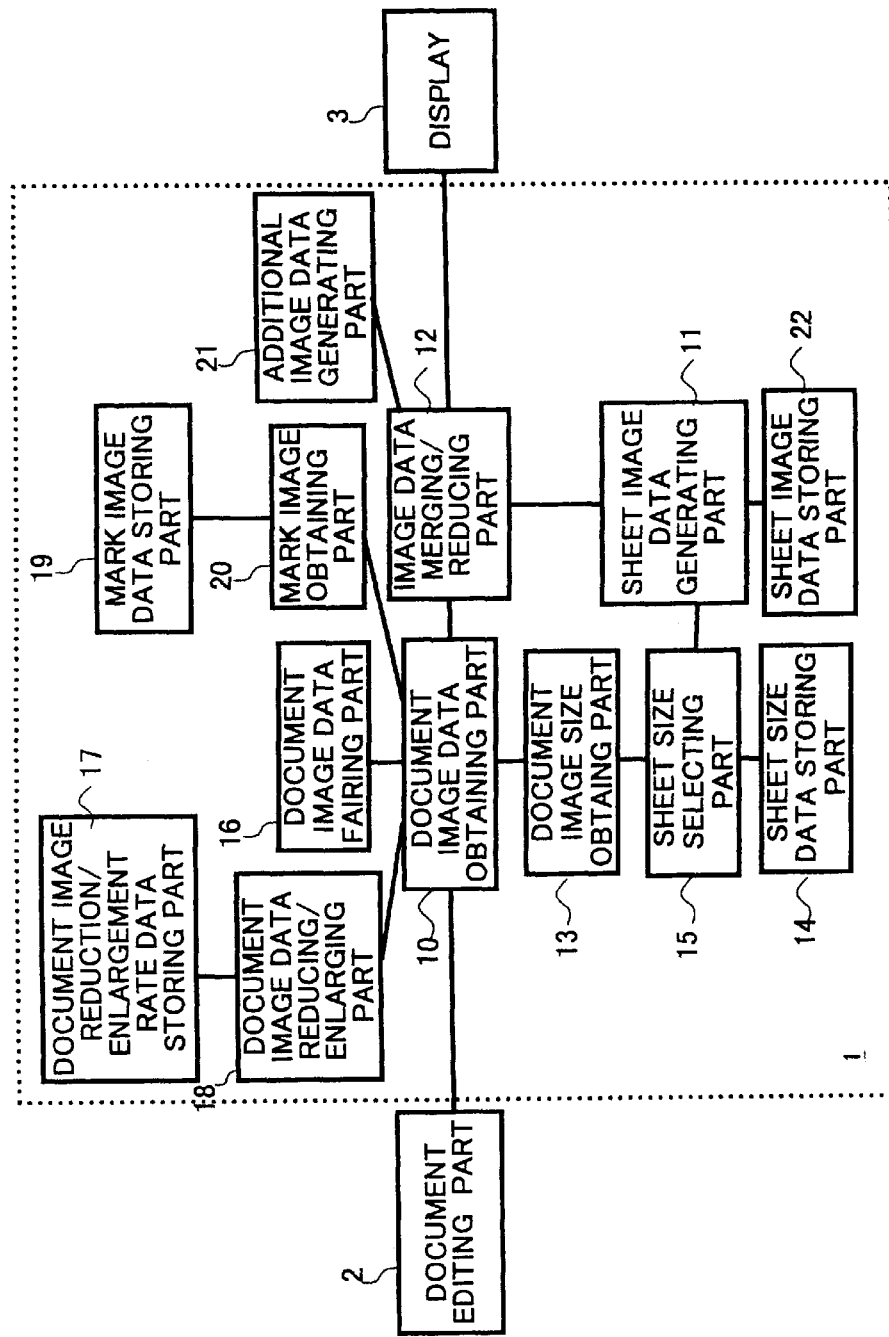
FIG. 1 is a block diagram illustrating a constitution of an image merging and displaying apparatus as one of examples of the present invention.

Hereinbelow, a plurality of embodiments of the present invention are explained referring to the several drawings. An image merging and displaying apparatus as one example of the present invention is illustrated in FIG. 1.

The image merging and displaying apparatus forms an image to be displayed on a display by reducing an image constituted by image data generated by merging document image data with sheet image data as explained below. As illustrated in FIG. 1, a personal computer includes the image merging and displaying apparatus 1 and a document editing part 2 such as a word processor, a document making device using a spread sheet program, an image editor, and so on, that edits document images by generating document image data.

The image merging and displaying apparatus 1 includes a document image data obtaining part 10 constituted by, e.g., an interface, a sheet image data generating part 11, an image data merging and reducing part 12, a document image size data obtaining part 13, a sheet size data storing part 14, a sheet size selecting part 15, and a document image data fairing part 16. The image merging and displaying apparatus 1 further includes a document image data reduction/enlargement rate data storing part 17, a document image reducing/enlarging part 18, a mark image data storing part 19, a mark image obtaining part 20, an additional image data generating part 21, and a sheet image data storing part 22. The image merging and displaying apparatus 1 is connected with a display 3 such as an LCD, CRT, and so on.

The document image data obtaining part 10 obtains document image data generated by the document editing part 2. The document image data obtaining part 10 is capable of sending both data faired by the document image data fairing part 16 and data of a document image reduced by the document image data reducing/enlarging part 18 to the image data merging and reducing part 12.

The document image data obtaining part 10 is further capable of sending data such as photographic data, data of a document image expanded to a sheet image, and so on, to the image data merging and reducing part 12. The document image data obtaining part 10 is further capable of sending mark image data to the image data merging and reducing part 12 by obtaining the mark image data either from the mark image obtaining part 20 when the document image data is not obtained from the document editing part 2 or from the mark image obtaining part 20 when the mark image data is not obtained from the document editing part 2.

The sheet image data generating part 11 generates sheet image data constituting a sheet image having either a size in accordance with a document image, data of which is obtained by the document image data obtaining part 10, or a prescribed size regardless of the document image size and sends the data to the image data merging and reducing part 12. The sheet image data generating part 11 further generates sheet image data including background image data such as optional color data or pattern data each read from the sheet image data storing part 22 in a state that such pattern data is expanded to the extent of the sheet image. The sheet image data generating part 11 then sends the data to the image data merging and reducing part 12.

The image data merging and reducing part 12 merges document image data sent from the document image data obtaining part 10 with sheet image data sent from the sheet image data generating part 11 that constitutes a sheet image having a prescribed size. The image data merging and reducing part 12 then reduces an image constituted by the thus merged image data, and then sends the data of the thus reduced image to the display 3 so that information thereof is displayed thereon to be confirmed. The image data merging and reducing part 12 further merges mark image data sent from the document image data obtaining part 10 with the sheet image data and reduces an image constituted by the thus merged image data and sends the data of the thus reduced image to the display 3.

The image data merging and reducing part 12 further merges additional image data sent from the additional image data generating part 21 with sheet image data and reduces an image constituted by the thus merged image data, and then sends the data of the thus reduced image to the display 3. The image data merging and reducing part 12 can be used for another function besides merging of the image data as mentioned above.

The document image size obtaining part 13 calculates a size of the document image constituted by the document image data obtained by the document image data obtaining part 10 and generates data indicating the size. The document image size obtaining part 13 then sends the data to the sheet size selecting part 15. The sheet size data storing part 14 is constituted by a memory that stores a plurality of prescribed sheet size data such as A-3, A-4, A-5, B-4, B-5 and a post card size data.

The sheet size selecting part 15 compares the document image and each of the prescribed standard sheet sizes and then selects one of corresponding standard sizes slightly larger than that of the document image. The sheet size selecting part 15 then sends data of the selected standard size to the sheet image data generating part 11.

The document image data fairing part 16 is capable of arranging character data to start a new paragraph when a previous paragraph is filled with the character data when the document image data does not include a layout information such as text character data. The document image data fairing part 16 shortens a sentence of the text character data by omitting blanked data therefrom.

The document image data reduction/enlargement rate data storing part 17 is constituted by a memory that stores reduction/enlargement rate data corresponding to a kind of the document editor as a document editing part 2. The document image data reducing/enlarging part 18 reduces document image data at a reduction rate indicated by the reducing/enlarging data corresponding to the kind of the document editor. The document image data reducing/enlarging part 18 is further capable of reducing document image to a minimum size that is a limit of enabling the user to confirm an image on the display, when an image formed by reducing the document image at the prescribed reduction rate has a size less than the minimum size.

The mark image data storing part 19 is constituted by a memory that stores mark image data constituting a mark such as an icon therein each indicating a kind of the document editing part 2. The mark image obtaining part 20 obtains mark image data that corresponds to the kind of the document editing part 2 from the mark image data storing part 19 and sends the data to the image data merging and reducing part 12. The additional image data generating part 21 generates additional image data indicating a document name, page number, and so on, and then sends the additional image data to the image data merging and reducing part 12.

The sheet image data storing part 22 is constituted by a memory and stores a plurality of optional color data and pattern data therein. The above-described document image data and/or sheet image data generated by a document editor and/or sheet image data generating device respectively are retained in bitmap memories respectively. Further, a bit map memory having a small capacity is utilized to retain image data generated by merging the document image data with the sheet image data and being thinned out to send the image data to the display 3. Further, the above-described reduction of an image is executed by thinning out a plurality of image data.

Figure 2:
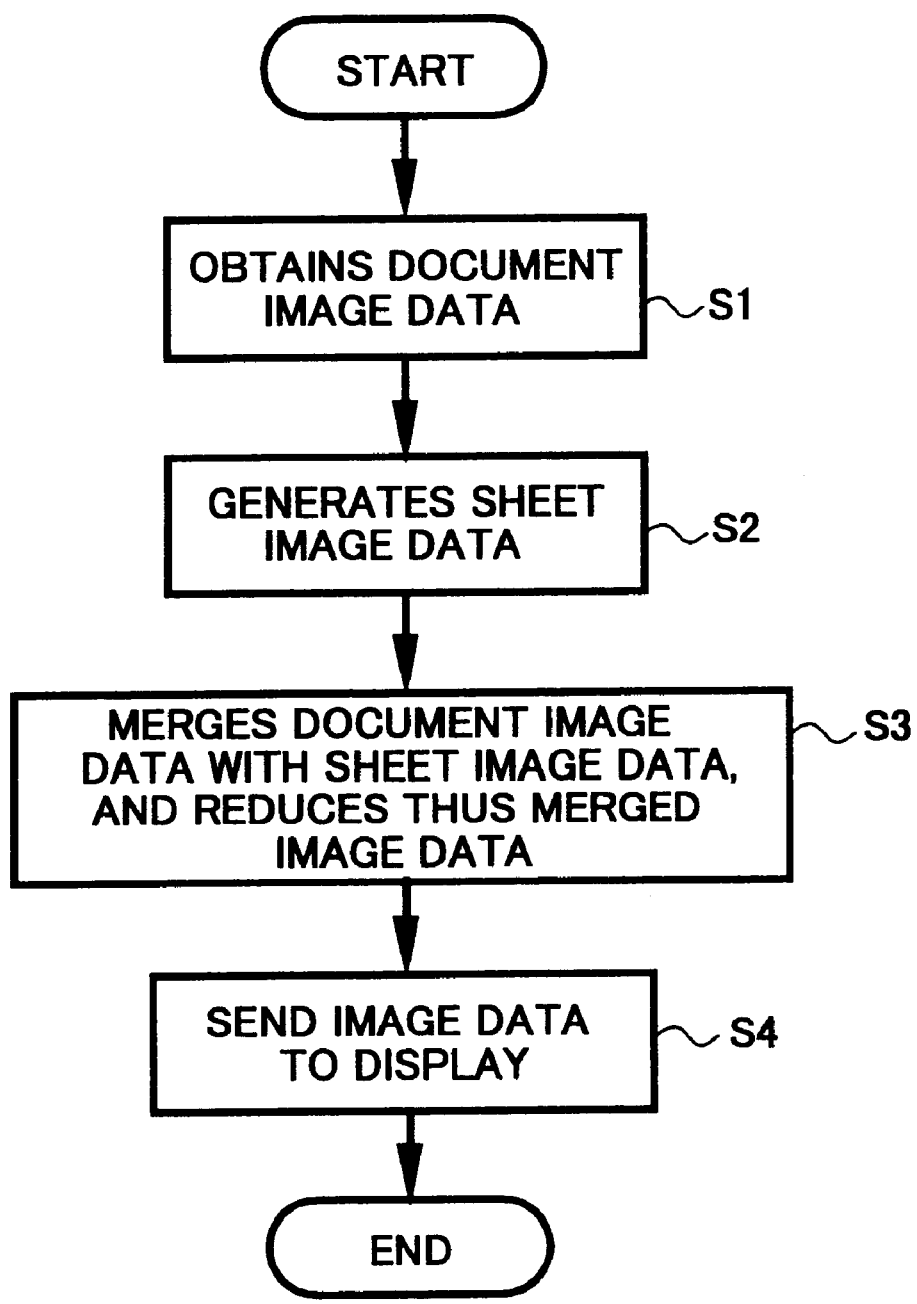
FIG. 2 is a flow chart illustrating a process in which the image merging and displaying apparatus as illustrated in FIG. 1 forms an image to be displayed on a display by reducing an image constituted by image data generated by merging document image data with sheet image data.

Hereinbelow, an operation of an image merging and displaying process is explained in detail referring to FIG. 2. As explained below, all of images to be displayed can be unified at a prescribed same size even though a plurality of document image data are obtained from a plurality of kinds of document editors as a document editing part 2.

To achieve the above-described operation, the document image data obtaining part 10 has a function to obtain document image data generated by the document editing part 2. Further, the sheet image data generating part 11 has a function to generate sheet image data constituting a sheet image having a prescribed size that accords with a document image constituted by the document image data. The image data merging and reducing part 12 has a function first to merge the document image data with the sheet image data, and second to reduce an image constituted by the thus merged image data at a prescribed reduction rate. The document image data obtaining part 10 obtains document image data generated by a document editing part 2 and then sends the same to the image data merging and reducing part 12 in step S1. A sheet image data generating part 11 generates a sheet image data constituting a sheet image having a prescribed size in accordance with the document image and sends the same to the image data merging and reducing part 12 in step S2.

The image data merging and reducing part 12 merges the sheet image data with the document image data to generate image data, and reduces an image constituted by the thus merged image data to form an image to be displayed on the display in step S3. The image data merging and reducing part 12 sends data of the image to be displayed to the display 3 so that information thereof is displayed thereon in step S4.

Figure 3:
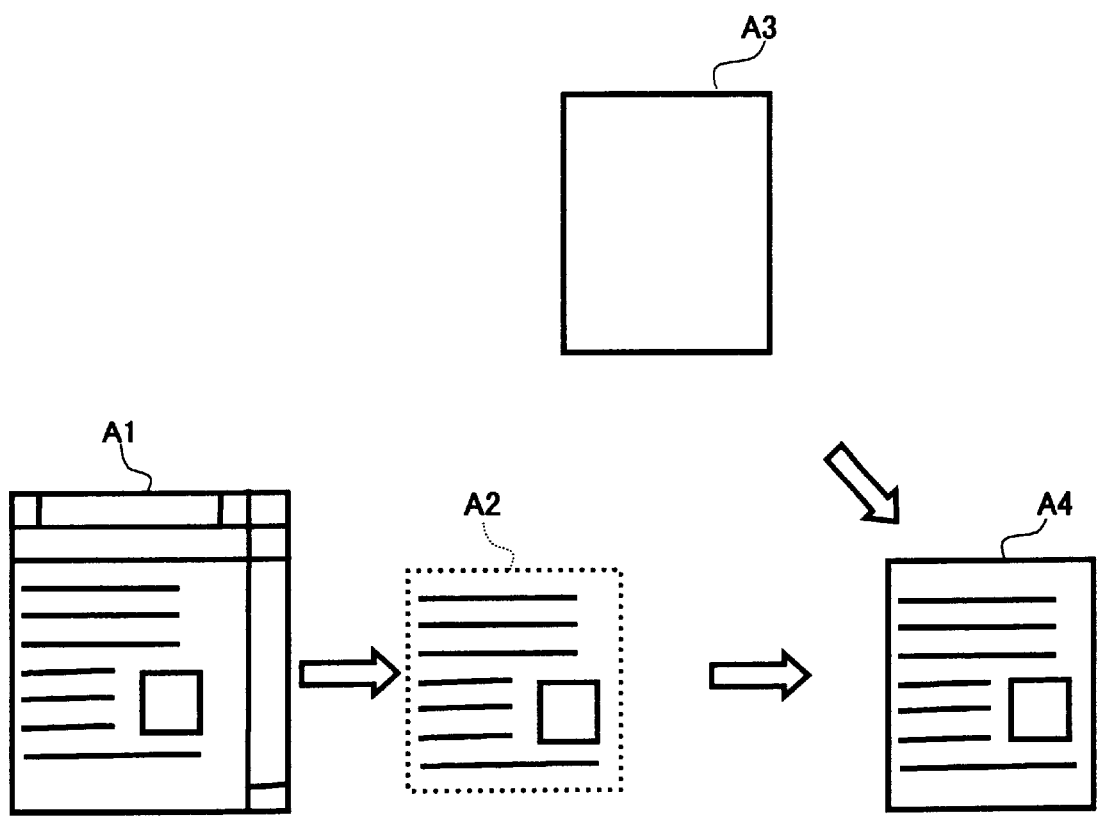
FIG. 3 is a diagram in which document image data A2 is merged with sheet image data A3 on a bit map memory and an image A4 formed by the thus merged image data is illustrated.

The above-described process is illustrated in FIG. 3 using models of document image data (A2), sheet image data (A3), and image data (A4) constituting an image to be displayed on the display 3. The document image data obtaining part 10 obtains document image data A2 generated by the document editing part 2, and then sends the same to the image data merging and reducing part 12. The sheet image data generating part 11 generates sheet image data A3 that constitutes a sheet image having a prescribed size that accords with the document image constituted by document image data A2.

The image data merging and reducing part 12 merges the data A2 with the data A3 to generate new image data, and reduces an image constituted by the thus merged data A2 and A3 at a prescribed reduction rate to generate data A4 that constitute an image to be displayed on the display 3 having a prescribed size. The data A4 is then sent to the display 3 and information thereof is displayed thereon. Thus, the images each to be displayed on the display are unified even though document images which may each have different sizes from each other are edited by different kinds of editors.

Hereinbelow, another embodiment of the present invention is explained referring to FIG. 3. When a plurality of kinds of document editors as a document editing part 2 are alternately used to generate document image data, and when the same memorize the bit map memory that retains the document image data therein, a margin is sometimes included or not included on both upper and lower edge portions and both left and right portions thereof depending upon the kind of the document editor. Thus, images to be displayed appear differently from each other when each of those images is reduced at a prescribed reduction rate, thereby resulting in difficulty in confirming the contents thereof through the display 3. To solve such a problem, the image merging and displaying apparatus 1 is capable of forming an image by using a sheet image having a standard size as described below.

To achieve this operation, the document image size obtaining part 13 has a function to obtain size data of a document image including any existing margin. The sheet size data storing part 14 has a function to store a plurality of kinds of standard-sheet size data therein. Further, the sheet size selecting part 15 has a function to select a sheet size slightly larger than that of the document image, data of which is obtained by the document image size obtaining part 13, referring to the sheet size data storing part 14.

Further, the sheet image data generating part 11 generates sheet image data based upon a sheet size selected by the sheet size selecting part 15. The image data merging and reducing part 12 first merges the sheet image data generated by the sheet image data generating part 12 with the document image data obtained by the document image data obtaining part 12, and second reduces an image constituted by the thus merged image data at a prescribed reduction rate so that information thereof can be easily confirmed through the display 3 when displayed.

Figure 4:
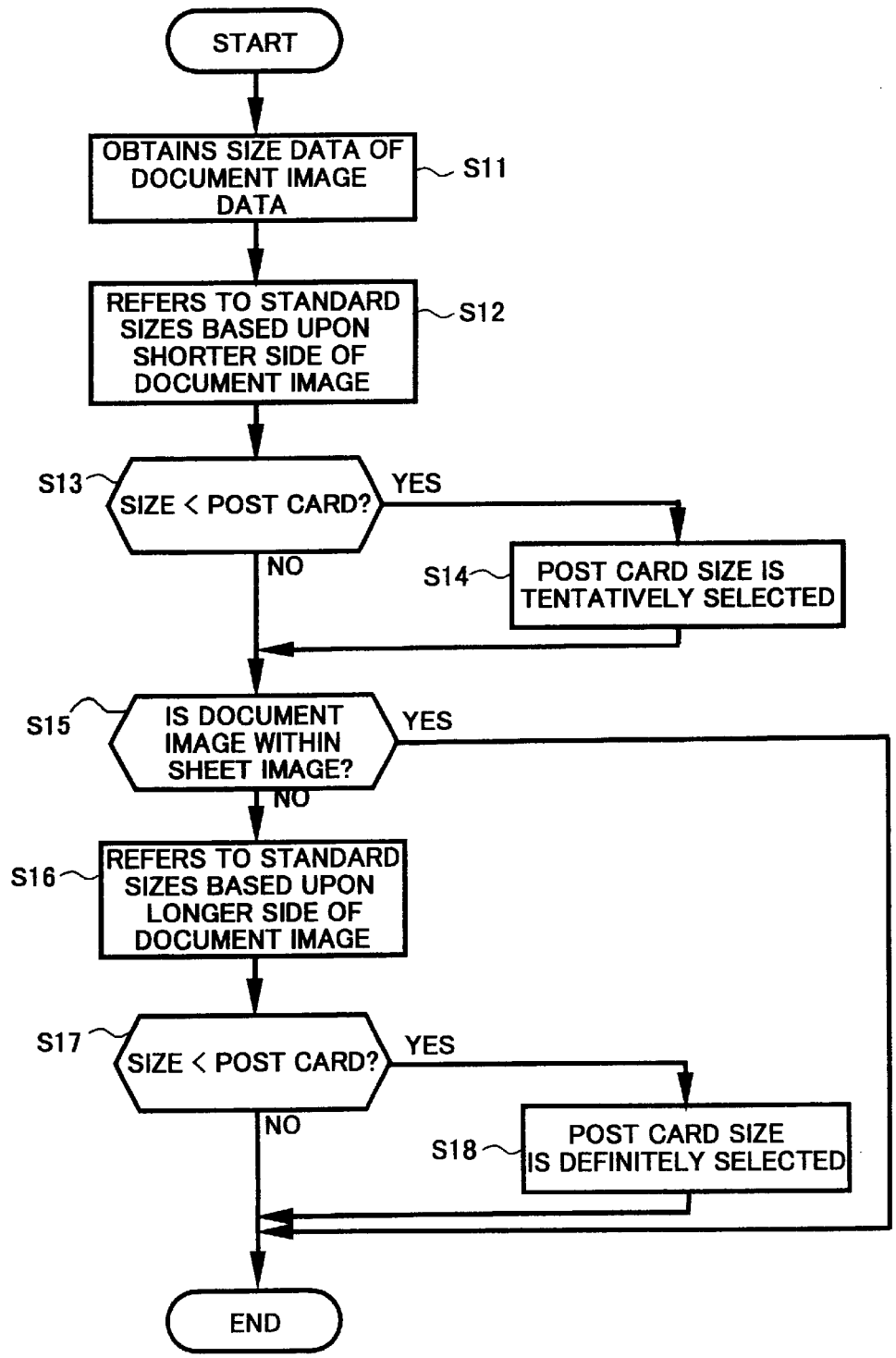
FIG. 4 is a flow chart illustrating a process in which the image merging and displaying apparatus as illustrated in FIG. 1 forms an image to be reduced having a prescribed standard size such as a post card size.

A process in which document image data is merged with the sheet image data constituting a sheet image having a post card size is illustrated in FIG. 4 using a flow chart. When the document image data obtaining part 10 obtains document image data from the document editing part 2 and sends the data to the image data merging and reducing part 12, the document image size obtaining part 13 obtains size data of the document image and sends the size data to the sheet size selecting part 15 in step S11. The sheet size selecting part 15 refers to a plurality of kinds of standard sheet size data such as A3, B4, A4, B5, A5 size data and a post card size data each stored in the standard size data storing part 14 to compare a shorter side of the document image with a shorter side of a sheet image indicated by each of the data in step S12.

In step S13, it is determined if the shorter side of the document image is shorter than that of the post card. When the shorter side of the document image is not shorter than that of the post card size, NO in step S13, another corresponding larger size is tentatively selected. When the shorter side is shorter, YES in step S13, the post card size is selected to be used and the operation proceeds to step S14.

Further, in step S15 it is determined if the size of the document image is within the post card size or another corresponding size. When the size is within the post card size or another corresponding size, each of the sizes is selected to be used, and when the size is larger than the post card size or another corresponding size, the operation proceeds to step S16. When the document image is larger than the post card or another corresponding sheet image, each of the longer sides of the prescribed standard sizes such as A3, B4, A4, B5 and A5 is compared with the longer side of the document image in step S16.

Further, in step S17 it is determined if the longer side of the document image is shorter than that of the post card size. When the longer side of the document image is longer, another corresponding size is selected to be used. When the longer side of the document image is shorter, YES in step S17, the postcard size is selected to be used in step S18. Sheet image data is generated in accordance with the size data selected as described above and is merged with document image data to generate image data.

Figure 5:
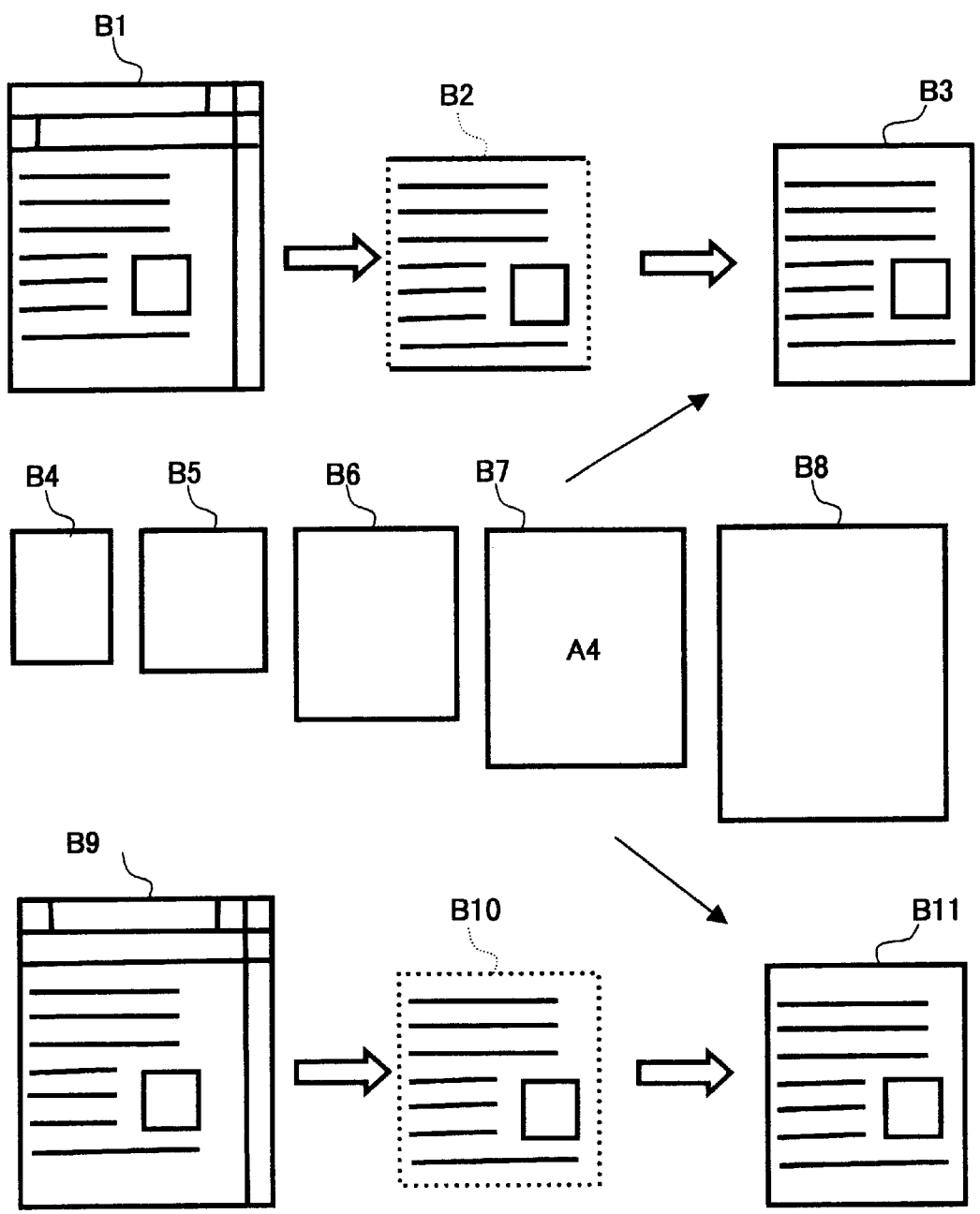
FIG. 5 is a diagram explaining that each of document image data B2 and B9 having a different layout is merged with sheet image data constituting a sheet image having a prescribed size B7.

The above-described process is illustrated in FIG. 5 using models of those image data. A pair of document data B1 and B9 each generated by a different kind of document editing part 2 is edited. The document data B1 includes therein document image data B2 and no margin data due to a kind of the document editor 2. The document data B9 includes therein document image data B10 and a margin data due to a kind of the document editor 2.

When the document image data obtaining part 10 obtains the document image data B2 from the document editing part 2, the document image size obtaining part 13 obtains the size data thereof and sends the same to the sheet size selecting part 15. The sheet size selecting part 15 then selects one of sizes of A3, B4, A4, B5, A5 and a post card size each stored in the sheet size data memory part 14 in a manner such that sheet size selecting part 15 selects a size slightly larger than that of data B2.

The sheet size selecting part 15 sends A4 size data to the sheet image data generating part 11 when A4 size is selected to be used. The sheet image data generating part 11 then generates sheet image data B7 having a standard size such as A4 size, and then sends the same to the image data merging and reducing part 12. The image data merging and reducing part 12 merges the sheet image data B7 sent from the sheet image data generating part 11 with the document image data B2 sent from the document image data obtaining part 10 to form an image to be reduced by generating image data B3. The image data B3 is sent to the display 3 and information thereof is displayed thereon.

On the other hand, when the document image data obtaining part 10 obtains the document image data B10, the document image size obtaining part 13 obtains the size thereof and then sends the same to the sheet size selecting part 15. The sheet size selecting part 15 then selects one of sheet sizes of A3, B4, A4, B5, A5 and a post-card size in a manner such that the sheet size selecting part 15 selects a size slightly larger than a document image constituted by the document image data B10. The sheet size selecting part 15 sends A4 size data to the sheet image data generating part 11 when A4 size is selected to be used. The sheet image data generating part 11 then generates sheet image data B7 having a standard size such as A4 size, and then sends the same to the image data merging and reducing part 12.

Thus, the margin of the document image is overlaid on the sheet image, and the image formed by reducing the document image having the margin appears the same as the image formed by reducing the document having no margin when each is displayed on the display 3. Further, each of the contents thereof is easy to be confirmed as if a content on a printing sheet is confirmed. Thus, the user quickly completes a confirmation work.

Hereinbelow, another embodiment of the present invention is explained referring to FIG. 6. When document image data includes image data such as photographic data, and when such data is merged with sheet image data and then an image constituted by the thus merged image data is reduced, a margin is created in the thus reduced image at the circumference of the photographic image reduced. Thus, since the reduced image does not naturally appear on the display 3, a content thereof is not easily confirmed by the user through the display 3.

Thus, in this embodiment, the image merging and displaying apparatus 1 first expands a document image to the extent of a sheet image and merges document image data of the thus expanded document image with the sheet image, and second reduces the thus merged image at a prescribed reduction rate, when document image data includes, e.g., photographic data, and so on.

To execute the above-described process, the document image data obtaining part 10 has a function to determine if the document image data obtained from the document editing part 2 includes image data such as photographic data or the like. The document image data obtaining part 10 further has a function to obtain document image data constituting a document image expanded to the sheet image from the document editing part 2.

Figure 6:
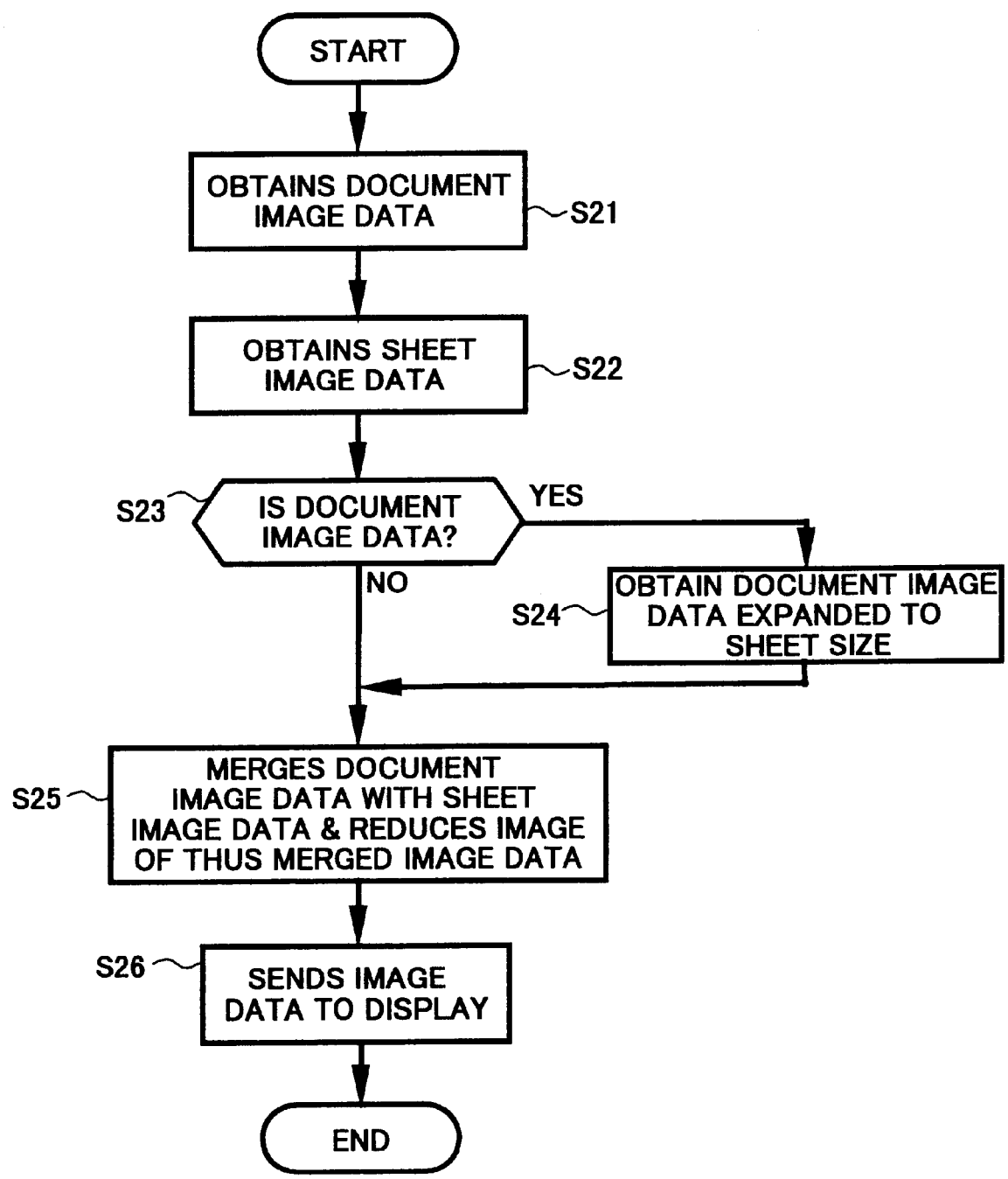
FIG. 6 is a flow chart illustrating a process in which the image merging and displaying apparatus as illustrated in FIG. 1 forms an image to be displayed by merging photographic image data with sheet image data.

The process is illustrated in a flow chart in FIG. 6. The document image data obtaining part 10 obtains document image data from the document editing part 2 and sends the same to the image data merging and reducing part 12 in step S21. The sheet image data generating part 11 then generates sheet image data constituting a sheet image having either a size that accords with the document image or a standard size selected based upon the size of the document image in step S22. Further, the sheet image data is sent to the image data merging and reducing part 12 in step S22, and then the operation proceeds to step S23.

In step S23, the document image data obtaining part 10 determines if document image data includes image data such as photographic data. If the document image data obtaining part 10 determines that the document image data includes such image data, YES in step S23, the document image data obtaining part 10 obtains document image data constituting a document image expanded to the extent of the sheet image having a prescribed size from the document editing part 2 in step S24. The data of the thus expanded document image is then sent to the image data merging and reducing part 12 and the operation then proceeds to step S25.

In step S25, the image data merging and reducing part 12 first merges the data of the expanded document image with the sheet image data to generate another image data. An image constituted by the thus merged image data is reduced, and the data of the thus reduced image is then sent to the display 3 to be displayed thereon in step S26. Thus, the document image is displayed on the display 3 in a state of being reduced.

When the document image data obtaining part 10 determines that the document image data does not include image data such as photographic data in step S23, the document image data is directly sent to the image data merging and reducing part 12. The image data merging and reducing part 12 first merges the document image data with the sheet image data, and the thus merged image data is reduced in step S25. The image data of the reduced image is then sent to the display 3 so that information thereof is displayed thereon in step S26. Thus, the document image is displayed on the display 3 in a reduced state.

The above-described determination if the document image data includes image data such as photographic data is executed by inspecting a content of the image data. However, the determination can be executed by detecting an image editor that always edits photographic data.

Thus, a margin which inherently appears on an image obtained by reducing the photographic image at the circumference of the photographic image can be eliminated, and thereby a photographic image portion can be displayed on the display 3 as large as possible, and accordingly a content thereof can be easily confirmed. Thus, a confirmation work for confirming the content of the image displayed on the display 3 is easier.

Hereinbelow, yet another embodiment of the present invention is explained referring to FIGS. 7 and 8. When document image data generated by the document editing part 2 does not include layout information such as a number of lines and a number of characters in a line as in text character data, and when a document image constituted by such text character data is reduced, the thus reduced image has a same layout as a window of the document editing part 2. Thus, since an image obtained by reducing such a document image that is to be displayed on the display 3 has a different layout from other images, a confirmation work for confirming a content of such an image is not quickly performed among other images.

In this embodiment, the image merging and displaying apparatus 1 unifies layouts such as sizes of images to be displayed on the display 3 into a prescribed size every time when the document image data does not include layout information. To execute the above-described process, the document image data obtaining part 10 functions as a data form information obtaining device that obtains data-form information of document image data generated by the document editing part 2. The document image data obtaining part 10 further functions as a judging device which determines if the document image data includes text character data therein based upon the obtained data form information. The document image data obtaining part 10 further functions as a text character data obtaining device that obtains text character data as document image data from the document editing part 2.

The sheet image data generating part 11 functions as a sheet image data generating device that generates sheet image data having a prescribed size and layout. Both the document image data fairing part 16 and the image data merging and reducing part 12 cooperatively function as an image data-arranging device. The image data-arranging device forms an image by arranging the text character data obtained by the text character data obtaining device on the sheet image data generated by the sheet image data generating part 11 in a manner as described below.

Figure 7:
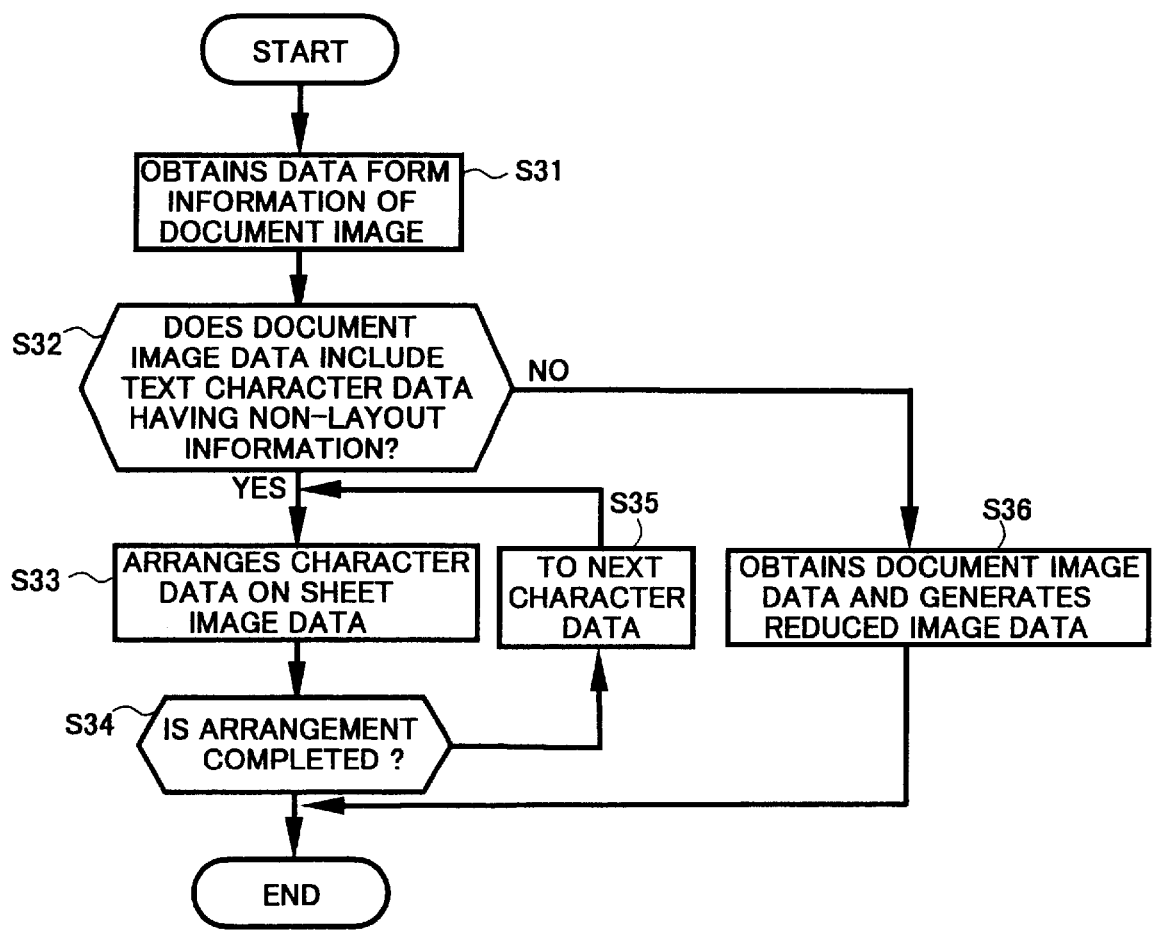
FIG. 7 is a flow chart illustrating a process in which the image merging and displaying apparatus as illustrated in FIG. 1 forms an image by merging document image data constituted by text character data having non-layout information therein with sheet image data.

A process in which image data is generated by using text character data not including layout information therein is explained in FIG. 7 using a flow chart. The document image data obtaining part 10 obtains data form information of the document image data generated by the document editing part 2 in step S31. In step S32, it is determined if the text character data of the document image data includes layout information based upon the data form information. When the text character data does not include the layout information, the sheet image data generating part 11 generates sheet image data having a prescribed layout and sends the same to the image data merging and reducing part 12 in step S33. Further, the document image data obtaining part 10 obtains text character data from the document editing part 2 in a unit of a character and sends it to the document-image-data fairing part 16 also in a unit of a character in step S33. The document image data fairing part 16 then arranges the text character data based upon a layout of the sheet image data by changing a column of characters when a prescribed number of characters is arranged on the previous column in step S33. In step S34, it is determined if all of the text character data has been written. When all of the text character data has not yet been written, the operation proceeds to step S35 and the next character data is processed in a same manner such as described above.

When all of the text character data has been obtained from the document editing part 2 and arranged based upon the layout of the sheet image data by thus repeating steps S33–S35, the process ends. The text character data thus arranged is then sent to the image data merging and reducing part 12 through the document image data obtaining part 10 from the document-image-data fairing part 16. The image data merging and reducing part 12 merges sheet image data with the character image data as the document image data and reduces an image constituted by the thus merged image data at a prescribed rate. The image data is then sent to the display 3 and information thereof is displayed on the display 3.

On the other hand, when document image data includes text character data having layout information therein in step S32, the document image data obtaining part 2 obtains document image data generated by the document editing part 2 and sends the same to the image data merging and reducing part 12 in step S36. Further, the sheet image data generating part 11 generates sheet image data constituting a sheet image having a prescribed size in accordance with the document image data and sends the same to the image data merging and reducing part 12 in step S36. Further, the image data merging and reducing part 12 merges the sheet image data with the document image data and reduces an image constituted by the thus merged image data at the prescribed rate. The image data is then sent to the display 3 and information thereof is displayed thereon.

The above-mentioned determination if document image data includes text character data having layout information therein is determined by directly inspecting a content of the document image data. However, a kind of the document editing part 2 that always edits text character data can be detected instead of inspecting the content of the document image data.

Figure 8:
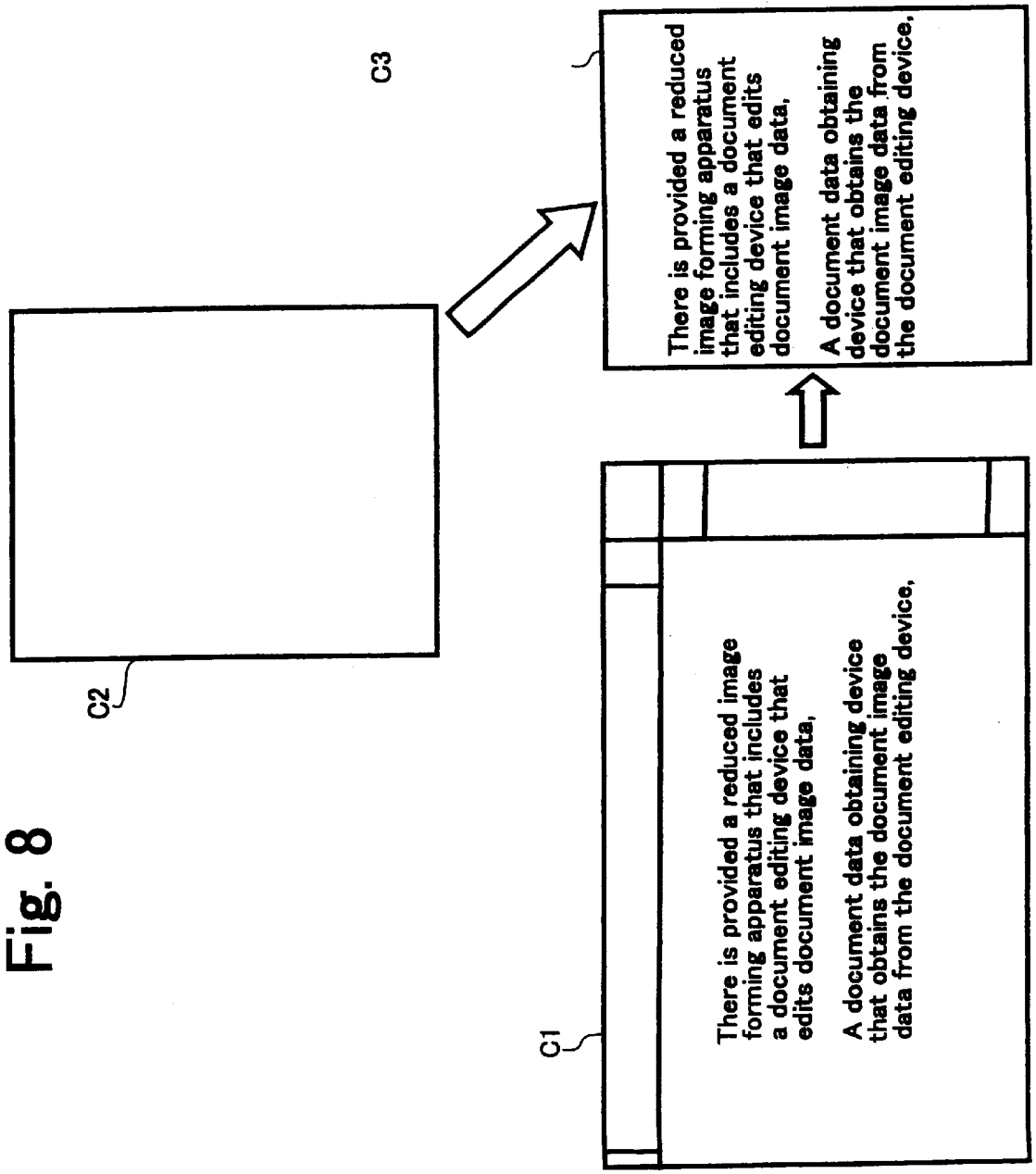
FIG. 8 is a diagram explaining that text character data is merged with sheet image data having prescribed layout information.

An image of the above-described process is illustrated in FIG. 8. The document image data obtaining part 10 obtains data form information of document image data generated by the document editing part 2 before obtaining the document image data therefrom. The document image data C1 is then obtained, and it is then determined if image data C1 includes text character data having non-layout information therein. The document image data obtaining part 10 obtains text character data of the document image data C1 from the document editing part 2 and sends the same to the document image data fairing part 16, when the document image data C1 includes text character data having non-layout information therein.

The sheet image data generating part 11 generates sheet image data C2 constituting a sheet image data having a prescribed size and sends the same to the image data merging and reducing part 12. The document image data fairing part 16 arranges the text character data based upon the layout information of the sheet image data C2 by changing a column of the characters when the previous column is filled with the characters. The document image data fairing part 16 then sends the thus arranged text character data to the image data merging and reducing part 12 through the document image data obtaining part 10. The image data merging and reducing part 12 merges the text character data sent from the document image data obtaining part 10 with the sheet image data C2 and reduces the thus merged image data, thereby generating image data C3. The image data C3 is then sent to the display 3 and information thereof is then displayed thereon.

Thus, even if document image data generated by the document editing part 2 includes text character data having non-layout information therein, and further a window size of the document editing part 2 is changed, since the text character data is arranged based upon layout information of the sheet image data, an image to be displayed on the display 3 always has a same size as long as a content of the text character data is not changed. Thus, the content of the image can be easily confirmed through the display 3.

Hereinbelow, yet another embodiment of the present invention is explained in detail referring to FIG. 9. When document image data such as text character data having no layout information therein includes one or more blank character data or line data therein, and when a document image having such text character data is reduced, since a number of characters except for the blank character data that is to be simultaneously displayed on the display 3 is relatively small, it is difficult to quickly confirm a content of all the images through the display 3 when a plurality of the images exist.

In this embodiment of the present invention, the image merging and displaying apparatus 1 generates image data constituting an image to be reduced and displayed such that the text character data or line data are closed up by omitting the blank character data or line data when the text character data having non-layout information therein includes such blank character data or line data. To achieve the above-described process, the document image data fairing part 16 functions as a closing up device that closes the text character data or line data by omitting the blank characters and lines existing among the text character data.

Figure 9:
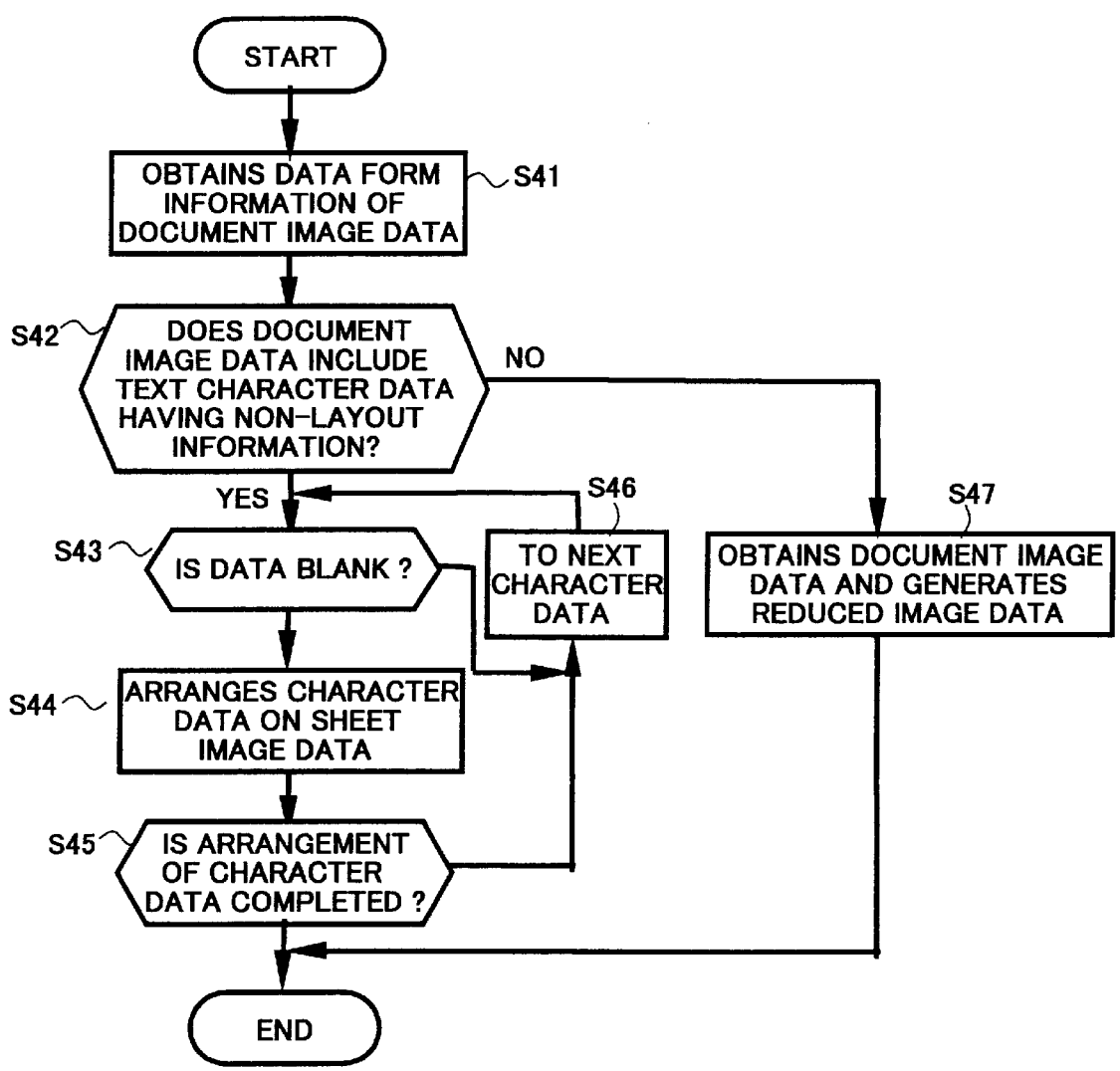
FIG. 9 is a flow chart illustrating a process in which the image merging and displaying apparatus as illustrated in FIG. 1 forms an image to be displayed by merging text character data and sheet image data in a manner that a plurality of blank character data and line data existing among the text character data are omitted.

The above-described process is illustrated in FIG. 9 using a flow chart. The document image data obtaining part 10 obtains data form information of document image data generated by the document editing part 2 in step S41. In step S42, it is determined if the document image data obtained includes text character data having non-layout information based upon the data form information. When the document image data includes the text character data having non-layout information, the sheet image data generating part 11 generates sheet image data having a prescribed size and sends the same to the image data merging and reducing part 12 in step S42. Whereas, the document image data obtaining part 10 obtains text character data as document image data from the document editing part 2 and sends the same to the document image data fairing part 16 in step S42. The document image data fairing part 16 determines if each of the document image data includes blank character data or line data in step S43.

When one of the document image data includes blank character data, the document image data fairing part 16 skips to a next character data in step S46, and the operation then proceeds to step S43 to determine if the next character or line includes a blank character or line. When the document image data does not include blank character data, the document image data are arranged based upon layout information of the sheet image data in step S44. In step S45, it is determined if all of the document image data is arranged in a manner as described above, and when arrangement thereof has not yet completed, a character data arranging process proceeds to step S46.

Thus, by repeating steps S43 through S46, the blank character data and line data are omitted. Further, the text character data is thus arranged based upon the layout information of the sheet image data thereby generating image data. The image data is then sent to the image data merging and reducing part 12. An image constituted by the image data is reduced at a prescribed rate by the image data merging and reducing part 12. The image data is then sent to the display 3 and information thereof is displayed thereon.

On the other hand, if it is determined that the document image data includes text character data having layout information in step S42, the document image data obtaining part 10 obtains document image data and sends the same to the image data merging and reducing part 12 in step S47. Whereas, the sheet image data generating part 11 generates sheet image data having a prescribed size and non-layout information and sends the same to the image data merging and reducing part 12 in step S47. The image data merging and reducing part 12 merges the sheet image data with the document image data and reduces an image constituted by the thus merged image data, and then sends the same to the display 3 so that information thereof is displayed on the display 3.

Determination if the document image data includes text character data having layout information is executed by directly inspecting a content of the document image data. A kind of the document editor 2 that edits text character data having non-layout information can be determined instead of inspecting the content of the document image data.

Figure 10:
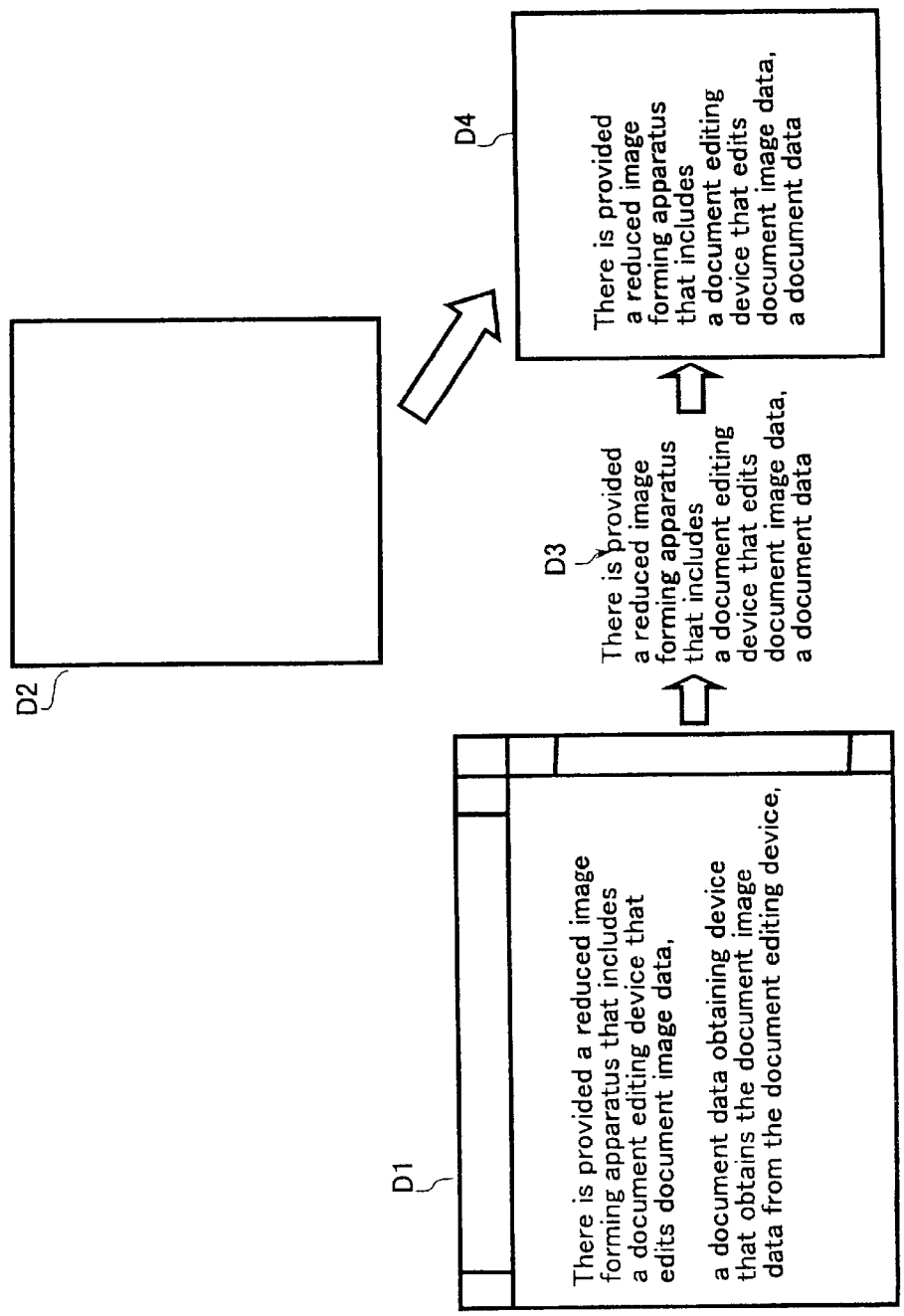
FIG. 10 is a diagram explaining that text character data having non-layout information is merged with sheet image data having layout information by closing up the character data by omitting blanked character data.

An image of the above-described process is illustrated in FIG. 10 using models of image data. The document image data obtaining part 10 first obtains data form information of document image data D1. It is then determined if the document image data D1 includes text character data having non-layout information. The text character data of the document image data D1 is obtained from the document editing part 2 and sent to the document image data fairing part 16.

The sheet image data generating part 11 generates sheet image data D2 having a prescribed size and layout information as illustrated in FIG. 10 and then sends the same to the image data merging and reducing part 12. Whereas, the document image data fairing part 16 closes up the text character data by omitting blank character data or line data existing among the text character data based upon the layout information of the sheet image data D2. The document image data fairing part 16 then sends the thus closed up image data D3 as illustrated in FIG. 10 to the image data merging and reducing part 12.

The image data merging and reducing part 12 merges the text character data with the sheet image data D2 by changing a column of the characters to accord with the layout information such as a number of characters in a column of the sheet image data D2. The image data D4 is thus generated as illustrated in FIG. 10. The image data D4 is then sent to the display 3 and information thereof is displayed thereon. Thus, since an image to be reduced can be formed in a state that the text character data is closed up by omitting blank character data and line data existing among the text character text data, a large number of characters can be simultaneously displayed on the display 3 and, accordingly, a confirmation task for confirming a content of the image displayed on the display 3 can be efficient.

Hereinbelow, yet another embodiment of the present invention is explained in detail. Although document images each edited by different kind of editors 2 may have a same standard size, such as an A-4 size, extending lengthwise, for example, each of layouts of the document images may be different from each other. Thus, when such document images are reduced at a prescribed same reduction rate, the thus reduced image that is to be displayed on the display 3 correspondingly varies in size. In this embodiment, the image merging and displaying apparatus 1 forms an image to be displayed on the display having a same size, even if a document image is edited by a different kind of document editor.

To achieve the above described purpose, the document image data reduction/enlargement rate data storing part 17 functions as a reduction/enlargement rate data storing device that stores reduction/enlargement rate data each corresponding to a kind of the document editing part 2. The document image data reducing/enlarging part 18 functions as an editor-kind detecting device that detects a kind of the document editing part 2. The document image data reducing/enlarging part 18 further functions as a reduction rate determining device that selects a reduction rate corresponding to the kind of editor detected by the editor kind determining device. The document image data reducing/enlarging part 18 further functions as a reducing/enlarging device that variably reduces or enlarges document images having different sizes to obtain document images each having a prescribed size based upon the reduction rate selected by the reduction rate determining device. Further, if each of the document images is different in layout, the document-image-data reducing/enlarging part 18 reduces or enlarges either a shorter side or longer side of the document image to form a document image having a same layout.

Figure 11:
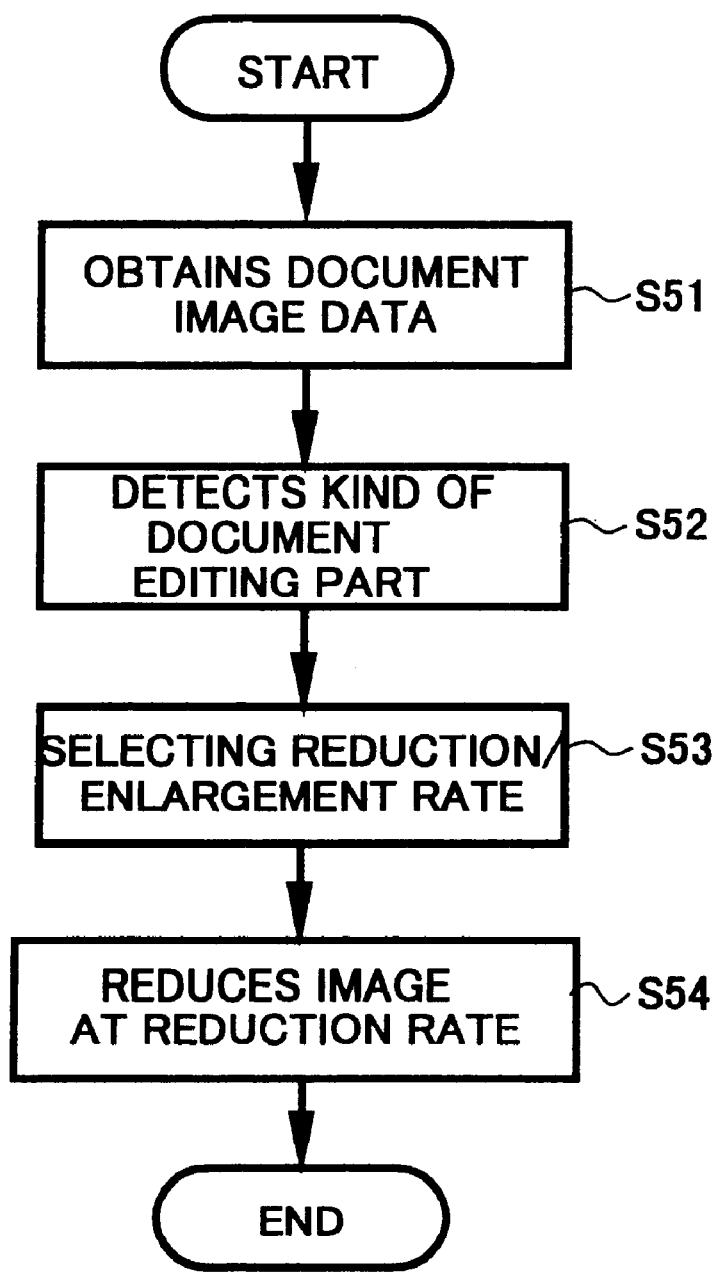
FIG. 11 is a flow chart illustrating a process in which the image merging and displaying apparatus as illustrated in FIG. 1 forms an image by reducing the document image at a prescribed reduction rate that corresponds to a kind of the document editor.

A process in which document images are variably reduced or enlarged corresponding to a kind of the document editing part 2 is illustrated in FIG. 11 using a flow chart. The document-image-data educing/enlarging part 18 obtains document image data that is obtained by the document image data obtaining part 10 in step S51. A kind of the document editing part 2 is then detected in step S52. One of reduction/enlargement rates that corresponds to the kind of the document editing part 2 is selected among the reduction/enlargement rates, data of which is stored in the document image data reduction/enlargement rate data storing part 17, in step S53.

A document image constituted by the document image data is reduced or enlarged at a reduction/enlargement rate to obtain a document image having a prescribed size, and the image data of the thus reduced document image is then sent to the image data merging and reducing part 12 through the document image data obtaining part 10 in step S54. The image data is then merged with the sheet image data generated beforehand by the sheet image data generating part 11. An image constituted by the thus merged image data is then reduced and information thereof is displayed on the display. 3 in a same manner as described earlier. Thus, even if a plurality of document images are edited by a plurality of kinds of editors, sizes of the images to be displayed on the display 3 can be unified, thereby resulting in easy confirmation thereof through the display 3.

Hereinbelow, yet another embodiment of the present invention is explained referring FIG. 12. Document image data sometimes cannot be obtained from a document editor, when the document editor is unique. Thus, since the document image does not exist, only a blank sheet image is displayed on a display, thereby making it impossible for a user to confirm a content of the document image. In this embodiment of the present invention, the image merging and displaying apparatus 1 generates image data having information indicating the document editor presently being used using an image mark such as an icon, when document image data is not obtained from the document editing part 2.

To achieve such a purpose, the document image data obtaining part 10 functions as a data detecting device that detects the image data sent from the document editing part 2 and functions as a mark image data obtaining device that obtains mark image data indicating the document editing part 2. The image data merging and reducing part 12 further functions to generate image data constituting an image to be displayed on the display 3 using the mark image data.

Figure 12:
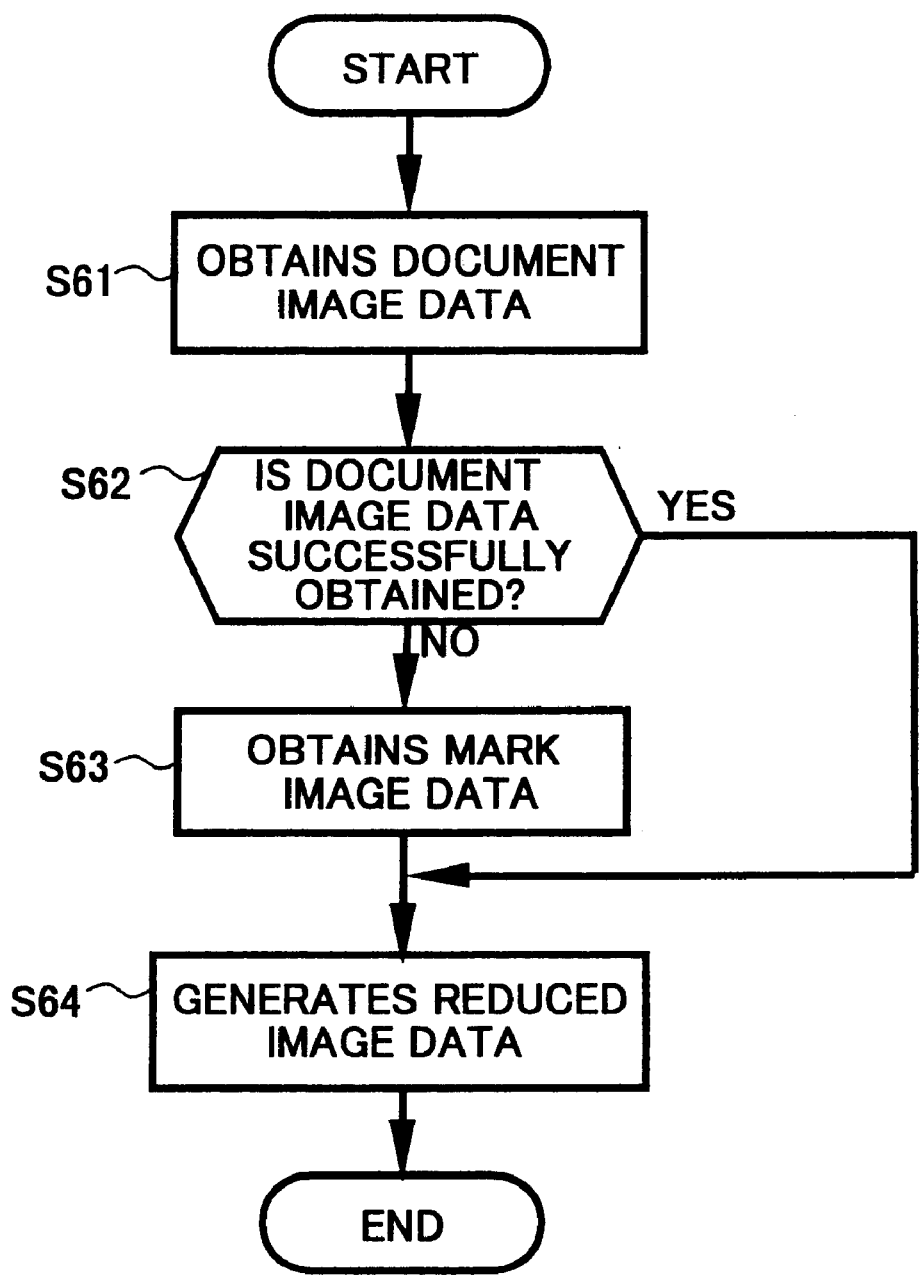
FIG. 12 is a flow chart illustrating a process in which the image merging and displaying apparatus as illustrated in FIG. 1 forms an image to be displayed by merging mark image data indicating a document editor used with sheet image data when the document image data cannot be obtained from the document editor.

A process in which an image to be displayed on the display is formed when document image data is not obtained from the document editing part 2 is illustrated in FIG. 12 using a flow chart. As shown in FIG. 12, the document image data obtaining part 10 obtains the document image data from the document editing part 2 in step S61. In step S62, it is determined if the document image data is successfully obtained. When the image data is not successfully obtained, NO in step S62, a mark image indicating the document editing part 2 presently used is obtained therefrom. Image data is then generated based upon the mark image data in step S63. On the other hand, if the document image data is successfully obtained, YES in step S62, image data is generated by merging sheet image data with the document image data, and then reducing an image constituted by the thus merged image data in a same manner as described earlier in step S64. Further, an image to be displayed on the display 3 is formed and displayed in a same manner as described earlier.

To generate the image data using the mark image data, a sheet image is formed on a bit map memory, for example, in accordance with a document image, and then the data of the sheet image is merged with the mark image data. Further, image data constituting a sheet image having a prescribed standard size can be merged with the mark image data, when document image data is not obtained from the document editing part 2.

Thus, image data including a mark image data indicating a document editing part 2 presently being used is generated, and information thereof is displayed on the display 3 when document image data is not obtained from the document editing part 2. Thus, a user can guess a content of the document image edited by the document editor even in such a case.

Figure 13:
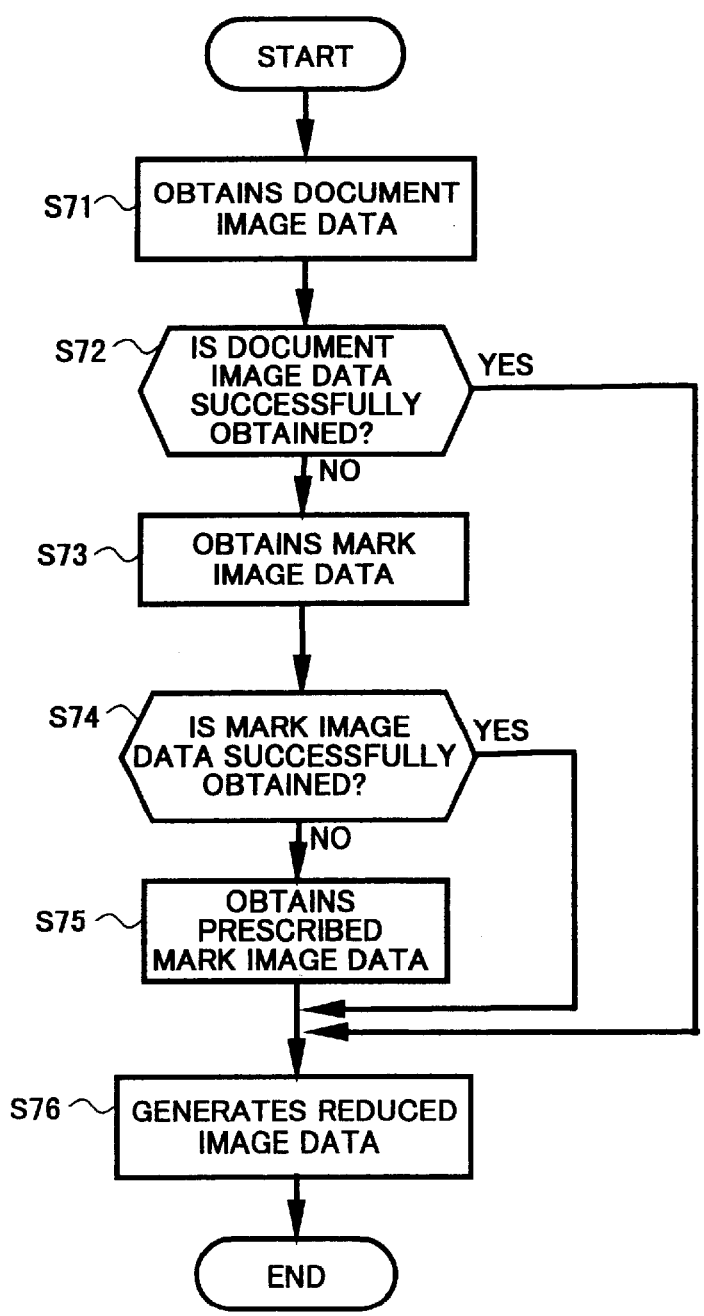
FIG. 13 is a flow chart illustrating a process in which the image merging and displaying apparatus as illustrated in FIG. 1 forms an image to be displayed by merging supplemental mark image data indicating a document editor stored in a memory with sheet image data when neither the document image data nor the mark image data are obtained from the document editor.

Hereinbelow, yet another embodiment of the present invention is explained referring to FIG. 13. The document image data obtaining part 10 sometimes cannot obtain either document image data or mark image data from a unique document editing part 2. This causes a blank image on the display 3, thereby making it impossible to confirm a content of the document image and even to guess at a kind of the document editing part 2. To avoid such a problem, the image merging and displaying apparatus 1 generates image data constituting an image to be displayed using mark image data indicating a kind of the document editing part 2 that is stored in a memory when neither the mark image data nor the document image data is obtained from the document editing part 2.

To achieve the above described operation, the mark image data storing part 19 has a function to store a plurality of mark image data each corresponding to a kind of document editing part 2 using an icon, for example. The mark image obtaining part 20 functions as a mark image obtaining device that obtains mark image data from the mark image data storing part 19. An operation of the image data generating process when neither the document image data nor the mark image data is obtained from the document editing part 2 is illustrated in FIG. 13 using a flow chart.

First, mark image data indicating a kind of the document editor is stored in the mark image data storing part 19. The document image data obtaining part 10 obtains document image data from the document editing part 2 in step S71. In step S72, it is determined if document image data is successfully obtained. When the document image data is not successfully obtained, NO in step S72, the document image data obtaining part 10 obtains mark image data indicating a kind of the document editor presently used in step S73. In step S74, it is determined if the mark image data is successfully obtained. When this is successful, YES in step S74, an image data generating process is started in step S76.

When on the other hand the mark image data is not successfully obtained, NO in step S74, a kind of the document editor is detected in step S75. Mark image data corresponding to the kind of document editor is obtained from the mark image data storing part 19 and is sent to the image data merging and reducing part 12 via the document image data obtaining part 10 in step S75. Image data is then generated by the image data merging and reducing part 12 including the mark image data in step S76. An image to be displayed on the display 3 is thus formed by the image data. Further, the image data is reduced and displayed in a same manner as mentioned earlier.

Thus, since mark image data each indicating a kind of editor are stored, and a corresponding one of the mark image data is selectively used to be merged with the sheet image data when neither the mark image data nor the document image data is obtained from the document editing part 2, the user can easily confirm the content of the document image by referring to the mark image displayed on the display 3.

Hereinbelow, yet another embodiment of the present invention is explained referring to FIG. 14. Document image data sometimes includes a relatively small number of image data. Thus, when the document image data is reduced at a prescribed reduction rate, the image data may disappear, since the document image dale are excessively thinned out. Such a problem can be avoided by properly designing a reduction/enlargement rate algorithm that calculates neighboring data bits using an And-logical calculation. However, even if this avoids the above described problem, the algorithm is sometimes unchangeable from an external source depending upon a kind of the document editing part 2.

An image merging and displaying apparatus 1 of this embodiment can avoid disappearing of the image data caused by excessively thinning out the image data. To achieve such an object, the document image data reducing/enlarging part 18 functions as an image size determining device that determines if document image is going to be reduced to a level less than a prescribed size that is a limit for a user to recognize a content of the image through the display 3. The document image data reducing/enlarging part 18 also functions as an image reducing device that reduces the document image to the prescribed level, when the document image is going to be reduced to the level less than the prescribed size.

Figure 14:
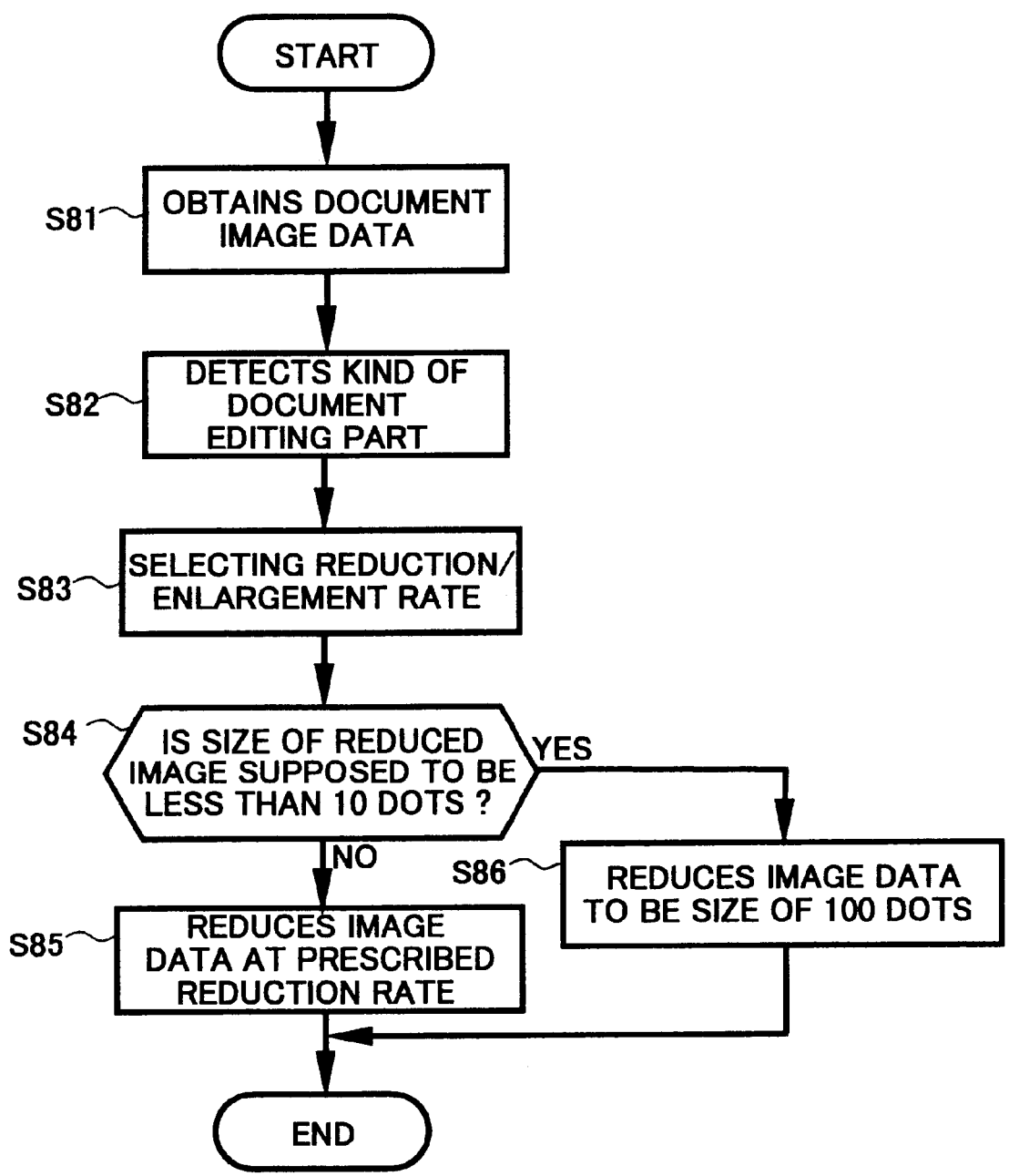
FIG. 14 is a flow chart illustrating a process in which an image formed and displayed by the image merging and displaying apparatus as illustrated in FIG. 1 is avoided from disappearing from the display by inhibiting excessive thinning out of the image data.

A document image reduction process is illustrated in FIG. 14 using a flow chart, in which a document image edited by the document editing part 2 is reduced to a prescribed level in a manner such that an image obtained by reducing the document image and displayed on the display 3 does not disappear by avoiding excessive thinning out of the image data as explained below. The document-image-data reducing/enlarging part 18 obtains document image data that is obtained by the document image data obtaining part 10 in step S81. A kind of document editor as a document editing part 2 is then detected in step S82. A reduction rate data is selected corresponding to the kind of the document editor among the plurality of reduction rate data in step S83. In step S84, it is determined if an image formed by reducing the document image at the prescribed reduction rate is supposed to include a shorter side having a length less than 10 dots.

When the length of the shorter side thereof is supposed to be less than 10 dots, YES in step S84, the document image is reduced to a level in which the shorter side thereof has a length of 10 dots in step S86. When, the length of the shorter side is supposed to be more than 10 dots, NO in step S84, the document image is reduced at the prescribed reduction rate in step S85. The image having a shorter side of more than 10 dots in length is then displayed on the display 3 in the same manner as described earlier.

Thus, an image can be displayed such that a user can easily confirm a content of the image even though the document image includes a small number of image data. This, as described-above, is performed by properly selecting a reduction rate so that the image data constituting an image to be displayed on the display 3 is not excessively thinned out.

Hereinbelow, yet another embodiment of the present invention is explained referring to FIG. 15. Depending upon a kind of a document editing part 2, a document image having a large size such as a document image formed by using a spread sheet program like LOTUS 1-2-3 is sometimes edited. This results in not making it possible to put such a document image on a sheet image.

To avoid such a problem, the document image data reducing/enlarging part 18 functions as a limit size determining device that determines if a size of a document image constituted by the document image data obtained from the document editing part 2 is larger than a prescribed size. The document image data reducing/enlarging part 18 also functions as a document image reducing device that reduces the document image to a level that can be overlaid on a sheet image having the largest size when the document is larger than the prescribed size.

Figure 15:
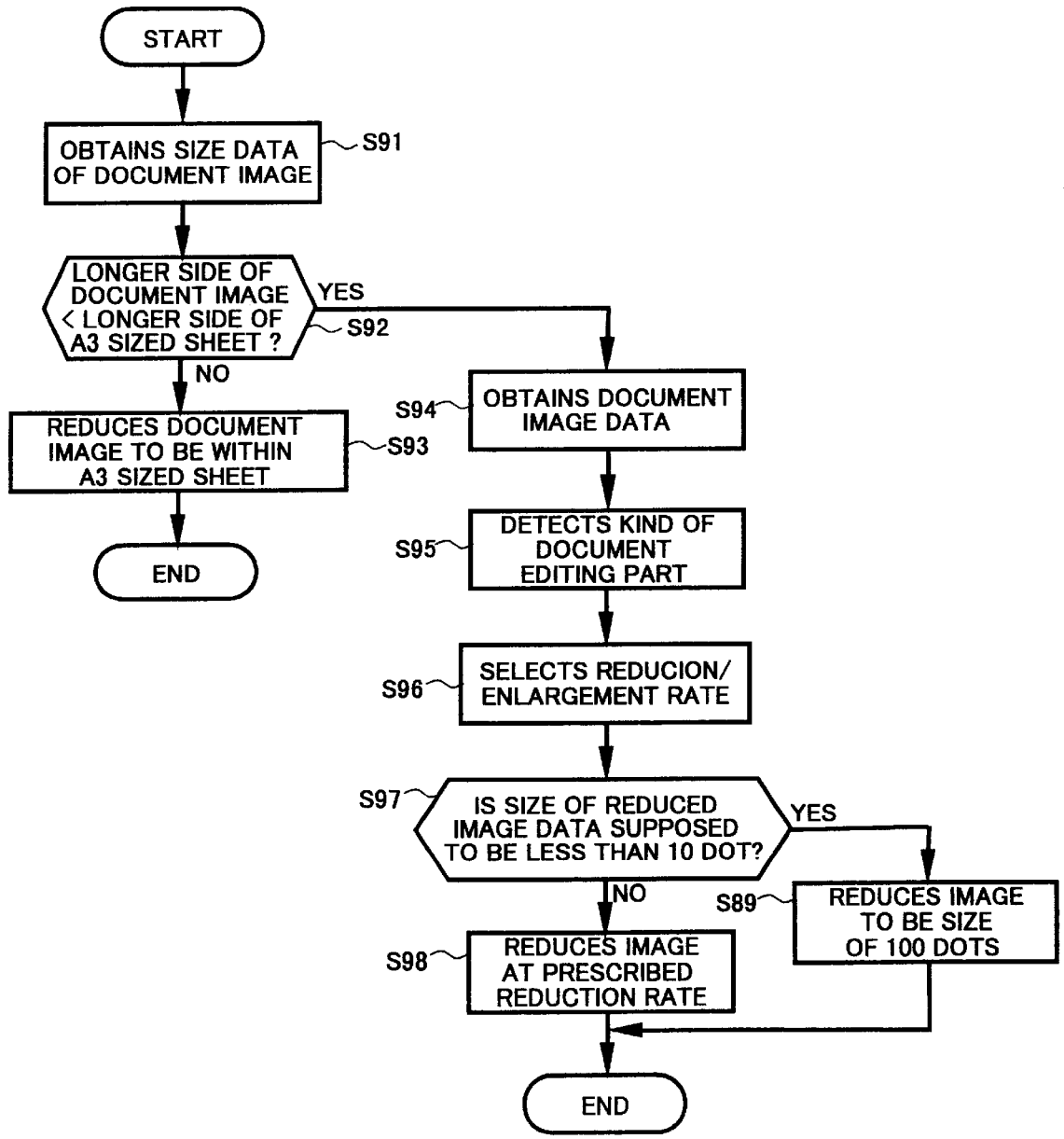
FIG. 15 is a flow chart illustrating a process in which an image to be reduced is formed by reducing the document image at a reduction rate to accord with a sheet image having maximum size when the document image is larger than the sheet image.

An image data generating process executed when a document image is larger than a sheet image of the largest size is illustrated in FIG. 15. The document image data reducing/enlarging part 18 obtains data indicating a size of a longer side of the document image constituted by the document image data obtained by the document image data obtaining part 10 in step S91. Then, in step S92, it is determined if the longer side of the document image is larger than a longer side of a largest sheet image, such as an A-3 sized sheet image. When the longer side of the document image is longer than that of the largest sheet image, the document image is reduced to a level that accords with the sheet image data in step S92.

When the longer side of the document image is on the other hand longer than that of the largest sheet image, the document image data is reduced at the prescribed reduction rate in steps S94 through S98. Since an image merging and displaying process starting from step S94 to step S98 is the same as illustrated in FIG. 14, an explanation thereof is omitted. Anyway, the above-described plurality of images is displayed on the display 3 for conformation purpose of the user. Thus, since the document image data having an extremely large size is reduced at a prescribed reduction rate to a level that accords with the largest size of the sheet image, a size of the image constituting an image to be displayed on the display 3 can be adjusted in a preferable range, thereby resulting in easiness of reviewing the image displayed on the display 3.

Hereinbelow, yet another embodiment of the present invention is explained referring to FIG. 16. When a plurality of document images look similar, it is difficult to discriminate the content of each image obtained by reducing the document images and displayed on the display 3 discriminated from each other when taking a look at only a layout of the image. To avoid such a problem, the image merging and displaying apparatus 1 of this embodiment can put additional information, such as a document name or a number of pages of the document image, on the image.

To execute the above-described process, the additional image data generating part 21 functions to generate additional image data constituting an additional image such as a document name, a number of pages, or the like, of the document image corresponding to the document image. The image data merging and reducing part 12 functions as an additional image data merging device that merges the additional image data generated by the additional image data generating part 21 with the document image data.

Figure 16:
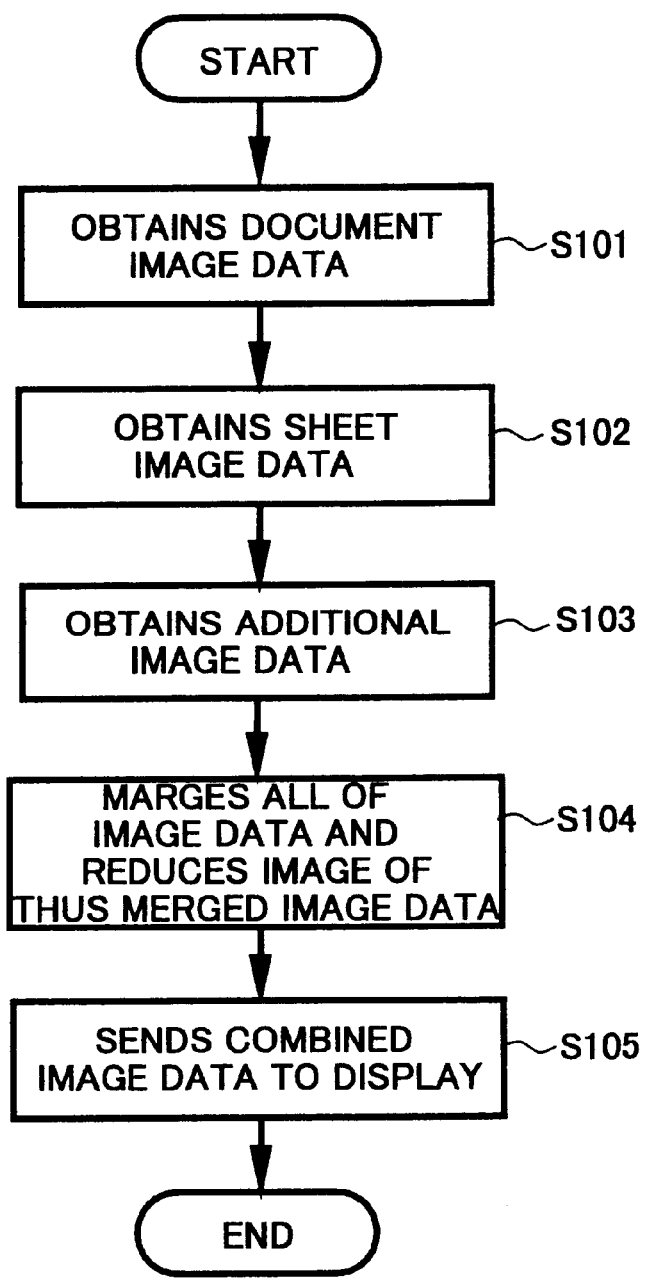
FIG. 16 is a flow chart illustrating a process in which an image to be displayed is formed such that additional information such as a document name and number of pages of the document image is included therein.

The above-described process is illustrated in FIG. 16 using a flow chart. The image data merging and reducing part 12 obtains document image data from the document image data obtaining part 10 in step S101. Sheet image data is then obtained from the sheet image data generating part 11 in step S102. Then, in step S103, additional image data is obtained. Image data is generated by merging the document image with the sheet image and the mark image data and an image constituted by the image data is reduced at a prescribed reduction rate in step S104. The image data of the thus reduced image is then sent to the display 3 and information thereof is displayed thereon. Thus, since the additional image is selectively put on the image to be displayed on the display 3, each of the images displayed thereon can be easily discriminated from each other by the user.

Hereinbelow, yet another embodiment of the present invention is explained referring to FIG. 17. When backgrounds of the plurality of images to be displayed on the display 3 look similar, it is not easy for the user to classify each of the plurality of images into one or more categories of such as a usage purpose and so on. The image merging/displaying apparatus 1 of this embodiment is capable of differentiating each of the backgrounds from each other.

To achieve such a purpose, the sheet image data storing part 22 functions as a pattern data storing device that stores pattern data such as mono color data and pattern data. Further, the sheet image data generating part 11 generates sheet image data by using the pattern data and so on stored in the sheet image data storing part 22.

Figure 17:
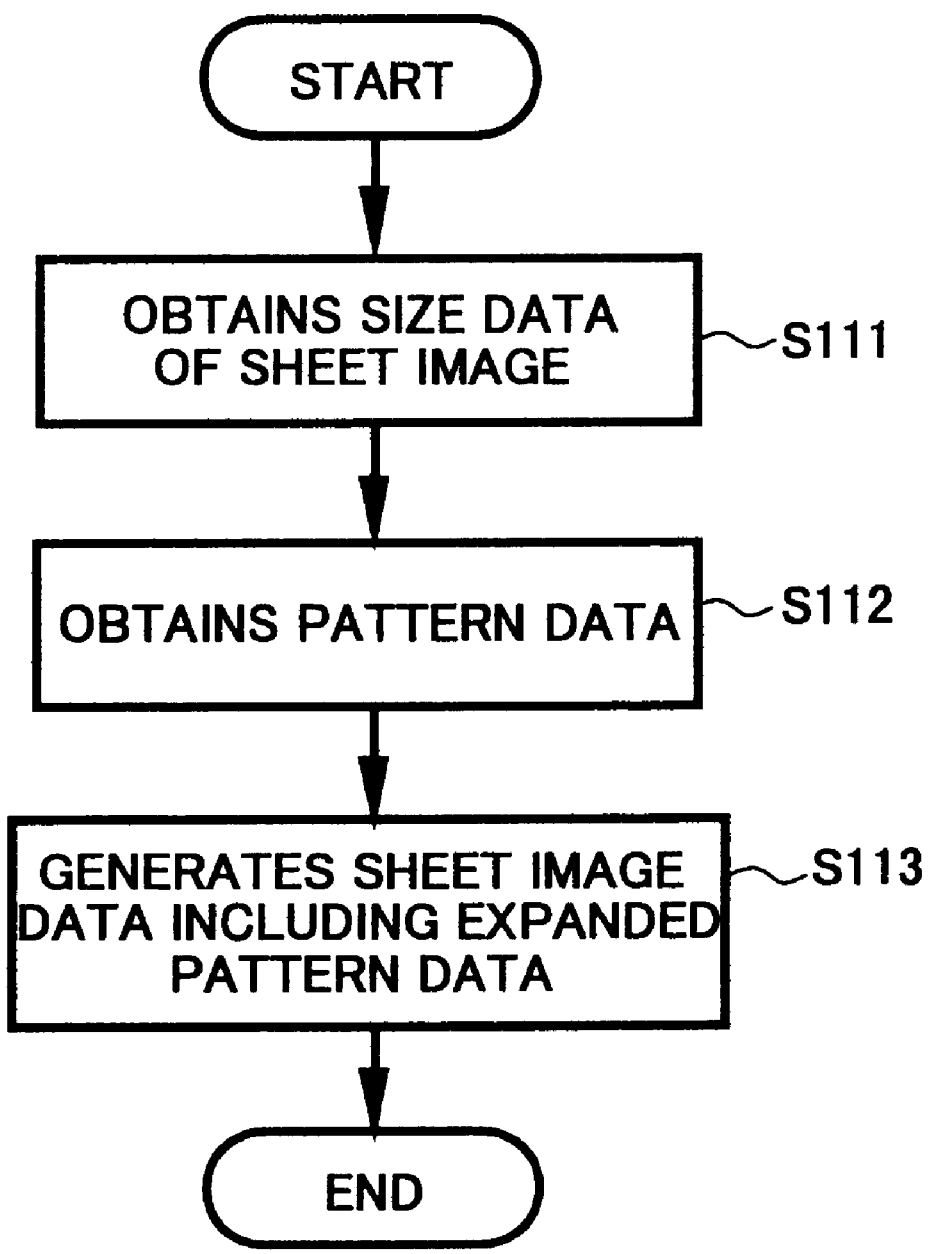
FIG. 17 is a flow chart illustrating a process in which an image to be displayed is formed such that a unique pattern is included therein as a background thereof.

A sheet image data generating process in which sheet image data is generated using the pattern data is illustrated in FIG. 17 using a flow chart. The sheet image data generating part 11 obtains size data of sheet image data in step S111. Pattern data is then obtained from the sheet image data storing part 22 in step S112. A pattern constituted by the pattern data is then expanded to the sheet image having a prescribed size and overlaid on the sheet image, and further the image data of the thus overlaid image is then sent to the image data merging and reducing part 12 in step S113. Following the above, the document image data is merged with the image data and an image constituted by the thus merged image data is then reduced to be displayed on the display 3. The image data of the thus reduced image is then sent to the display 3 and displayed thereon.

Thus, since the mono color data or pattern data is put on the sheet image data, and then the image data is formed by reducing such image data, each of the images displayed on the display 3 has a background of a different appearance from each other. Thus, a content of the image displayed thereon can be easily confirmed and classified into one or more categories based upon the difference of the background.

Numerous additional modifications and variations of the present invention are possible in light of the above teachings. It is therefore to be understood that within the scope of the appended claims, the present invention may be practiced other than as specifically described herein.

This application is based upon the Japanese patent application No. 09-311843 filed in Japanese Patent Office on Nov. 13, 1997, the entire contents of which are hereby incorporated by reference.

What is claimed is:

1. An image merging and displaying apparatus for forming an image to be displayed on a display, comprising:

a document editing device configured to edit a document by generating document image data;

a document image data obtaining device configured to obtain said document image data from said document editing device;

a sheet image data generating device configured to generate sheet image data that constitutes a sheet image having a prescribed size in accordance with said document image, by storing sheet size data of varying sizes and selecting the prescribed size from the sheet size data of varying sizes;

an image data merging device configured to merge said document image data with said sheet image data; and a reducing device configured to reduce an image constituted by the merged image data at a prescribed reduction rate to form said image to be displayed on said display.

2. An image merging and displaying apparatus as claimed in claim 1, further comprising:

a size data obtaining device configured to obtain size data of said document image;

a sheet size-selecting device configured to select a sheet size slightly larger than said document image; and wherein said sheet image data generating device generates the sheet image data constituting an sheet image having said selected sheet size.

3. An image merging and displaying apparatus as claimed in claim 1, further comprising:

a data kind determining device configured to determine if said document image data includes specified image data; and an expanded document image data obtaining device configured to obtain data of a document image expanded to said sheet image when said data kind determining device determines that said document image data includes said specified image data.

4. An image merging and displaying apparatus as claimed in claim 1, further comprising:
   a reduction/enlargement rate data storing device configured to store a plurality of reduction/enlargement rate data therein each indicating a reduction/enlargement rate corresponding to a kind of said document editor;
   an editor kind detecting device configured to detect a kind of said document editor;
   a reduction rate determining device configured to determine a reduction rate corresponding to said kind of document editor; and
   a document image-reducing device configured to reduce said document image constituted by document image data obtained by said document image data obtaining device at said determined reduction rate.

5. An image merging and displaying apparatus as claimed in claim 1, further comprising:
   a document image data determining device configured to determine if document image data is obtained from said document-editing device; and
   a mark image data obtaining device configured to obtain mark image data from said document editing device when said document image data determining device determines that said document image data is not obtained therefrom, wherein,
      said image data merging device merges said mark image data with said sheet image data and reduces an image constituted by the merged image data to form said image to be displayed on said display.

6. An image merging and displaying apparatus as claimed in claim 1, further comprising:
   an image size determining device configured to determine if the document image is larger than a sheet image of a largest size; and
   a document image reducing device configured to reduce said document image to a level in which an image formed by reducing said document image accords with said sheet image of the largest size when said image size determining device determines that said document image is larger than said sheet image.

7. An image merging and displaying apparatus as claimed in claim 1, further comprising:
   an additional image data generating device configured to generate additional image data constituting an additional image to be put on a corresponding of said document image; and
   an additional data merging device configured to merge said additional image data with said document image data.

8. An image merging and displaying apparatus as claimed in claim 1, further comprising:
   a pattern data storing device configured to store pattern data constituting a pattern for a background of said sheet image; and
   a sheet image merging and displaying device configured to form a sheet image by merging sheet image data with one of said pattern data.

9. An image merging and displaying apparatus for forming an image to be displayed on a display, comprising:
   a document editing device configured to edit a document by generating document image data;
   a data form information obtaining device configured to obtain data form information of said document image data generated by said document editing device;
   a character data determining device configured to determine if said document image data is constituted by character data not having layout information based upon said data form information;
   a text character data obtaining device configured to obtain text character data from said document-editing device;
   a sheet image data generating device configured to generate sheet image data constituting a sheet image having prescribed layout information when said text character data not including layout information is obtained, by storing sheet size data of varying sizes and selecting the prescribed size from the sheet size data of varying sizes; and
   an image data merging device configured to merge said document image data with said sheet image data by arranging said text character data on said sheet image data based upon said layout information; and
   a reducing device configured to reduce an image constituted by the merged image data to form said image to be displayed on said display.

10. An image merging and displaying apparatus as claimed in claim 9, further comprising:
    a character data closing up device configured to close up said character data by omitting said blank character data existing among said text character data.

11. An image merging and displaying apparatus as claimed in claim 9, further comprising:
    a mark image data storing device configured to store a plurality of mark image data each corresponding to a kind of said document editing device; and
    a mark image data obtaining device configured to obtain mark image data corresponding to said kind of the document editing device detected by said editor kind detecting device from said mark image data storing device; wherein,
       said image data merging device merges said mark image data with said sheet image data and reduces an image constituted by the merged image data to form said image to be displayed on said display.

12. An image merging and displaying apparatus as claimed in claim 9, further comprising:
    an image size determining device configured to determine if an image to be formed by reducing said document image at a prescribed reduction rate is supposed to be less than a prescribed size; and
    a document image reducing device configured to reduce said document image at another reduction rate so that an image obtained by reducing said document image accords with a sheet image having said prescribed size, when said image to be formed by reducing said document image at said prescribed reduction rate is supposed to be less than said prescribed size.

13. An image merging and displaying method for forming an image to be displayed on a display, comprising the steps of:
    editing document image by generating document image data;
    obtaining said document image data from said document editing device;
    generating sheet image data constituting a sheet image having a size in accordance with said document image, by storing sheet size data of varying sizes and selecting the prescribed size from the sheet size data of varying sizes;
    merging document image data with said sheet image data; and
    reducing an image constituted by the merged image data to form said image to be displayed on said display.

14. An image merging and displaying method as claimed in claim 13, further comprising steps of:
  obtaining size data of said document image;
  determining a sheet size slightly larger than that of said document image; and
  wherein said generating step generates sheet image data that constitutes a sheet image having said determined sheet size.

15. An image merging and displaying method as claimed in claims 13, further comprising steps of:
  determining if said document image data includes specified image data;
  enlarging a document image constituted by said document image data to an extent of said sheet image when said data kind detecting device detects said specified data; and
  obtaining document image data of the expanded document image.

16. An image merging and displaying method as claimed in claim 13, further comprising steps of:
  storing a plurality of reduction/enlargement rate data each corresponding to a kind of said document editor;
  detecting a kind of said document editor;
  determining reduction rate data that corresponds to said kind of document editor among from said reduction/enlargement rate data; and
  reducing said document image at said determined reduction rate.

17. An image merging and displaying method as claimed in claim 13, further comprising steps of:
  determining if document image data is obtained from said document-editing device;
  obtaining mark image data from said document editing device when said data determining device does not determine said document image data to be obtained therefrom;
  merging said mark image data with said sheet image data; and
  reducing an image constituted by the merged image data to form an image to be displayed on said display.

18. An image merging and displaying method as claimed in claim 17, further comprising steps of:
  storing a plurality of mark image data each corresponding to a kind of said document editing device;
  obtaining mark image data that corresponds to said kind of the document editing device detected by said editing device kind detecting device;
  merging said mark image data with said sheet image data; and
  reducing an image constituted by the merged image data to form an image to be displayed on said display.

19. An image merging and displaying method as claimed in claim 13, further comprising steps of:
  determining if document image to be formed by reducing at a prescribed reduction rate is supposed to be less than a prescribed size; and
  reducing said document image at another reduction rate so that a document image reduced accords with said prescribed size.

20. An image merging and displaying method as claimed in claim 13, further comprising steps of:
  generating additional image data constituting an additional image put on a corresponding document image; and
  merging said additional image data with document image data.

21. An image merging and displaying method as claimed in claim 13, further comprising steps of:
  storing pattern data, and
  generating sheet image data with which one of said stored pattern data is merged.

22. An image merging and displaying method for forming an image to be displayed on a display, comprising steps of:
  editing document image by generating document image data;
  obtaining said document image data from said document editing device;
  obtaining data form information of said document image data;
  determining if said document image is constituted by character data having non layout information based upon said data form information;
  obtaining text character data from said document editing device when said data form information does not include said layout information;
  generating sheet image data having a prescribed layout information by storing sheet size data of varying sizes and selecting a prescribed size from the sheet size data of varying sizes;
  merging said document image data with said sheet image data by arranging said text character data on said sheet image data based upon said layout information; and
  reducing an image constituted by thus merged image data to for an image to be displayed on said display.

23. An image merging and displaying method as claimed in claim 22, further comprising step of:
  closing said character data up by omitting blank character data existing among said text character data.

* * * * *